(12) United States Patent
Francisquini

(10) Patent No.: US 7,441,847 B2
(45) Date of Patent: Oct. 28, 2008

(54) METALLIC PROFILE FOR THE COMPOSITION OF STRUCTURES FOR THE ASSEMBLY OF CABINET/ENCLOSURES

(76) Inventor: Melquisedec Francisquini, Rua Dr. Oscar Monteiro de Barros, 580 apt. 11, Vila Suzana, Sao Paulo (BR) 05641-010

( * ) Notice: Subject to any disclaimer, the term of this patent is extended or adjusted under 35 U.S.C. 154(b) by 323 days.

(21) Appl. No.: 10/516,975

(22) PCT Filed: Jun. 4, 2003

(86) PCT No.: PCT/BR03/00071

§ 371 (c)(1), (2), (4) Date: Dec. 6, 2004

(87) PCT Pub. No.: WO03/105552

PCT Pub. Date: Dec. 18, 2003

(65) Prior Publication Data

US 2005/0174020 A1 Aug. 11, 2005

(30) Foreign Application Priority Data

Jun. 6, 2002 (BR) .................................. 0202231

(51) Int. Cl.
*A47B 47/00* (2006.01)
(52) U.S. Cl. ................................. 312/265.3
(58) Field of Classification Search ............ 312/265.1, 312/265.2, 265.3, 265.4, 223.1, 223.2, 257.1, 312/140; 211/26, 182, 189; 52/653.1, 653.2, 52/656.1
See application file for complete search history.

(56) References Cited

U.S. PATENT DOCUMENTS 4,643,319 A * 2/1987 Debus et al. ............... 211/189
5,333,950 A * 8/1994 Zachrai .................... 312/265.1
5,749,476 A * 5/1998 Besserer et al. .............. 211/26
6,231,142 B1 5/2001 Pochet
6,428,127 B1 8/2002 Rasmussen
6,808,240 B2 * 10/2004 Altena ..................... 312/265.4

FOREIGN PATENT DOCUMENTS

FR 2677084 12/1992

* cited by examiner

*Primary Examiner*—James O Hansen
(74) *Attorney, Agent, or Firm*—William J. Sapone; Coleman Sudol Sapone P.C.

(57) ABSTRACT

Comprehending a profile (104) that, from the outside, constitutes the means of support for the closings and accessories, while on the inside, the same structure configures the struts for the assembly of components and electric and electronic devices, in addition to which this profile (104) presents a cross section with a geometry defined by a central core in the tubular shape with a quadrangular section (105), where the vertex (106) is oriented to the inside of the cabinet (100), while the opposite vertex (107) is oriented to the outside of this cabinet (100), and these two vertexes are formed by single walls, which does not apply to the other two remaining vertexes (108) and (109), which are defined by the junction of the sheet that forms the first two vertexes (106-107) and from this point on, the double walls (110) are extended in a coplanar position in relation to the adjacent walls (106a-106b) of the vertex (106), forming opposite rims (111a 111b), whose ends are perpendicularly folded forming short ends (112) and (113) which, besides being grooved (114), are also distanced in parallel from the adjacent walls (107a-107b) of the vertex (107), whose wall (107a) includes a projection perpendicularly oriented to the outside, configuring a perpendicular rim (115), finalizing the configuration of a profile that permits the assembly of structures (103) which, in turn, receives different closings (101) and doors (102), configuring cabinets/enclosures or boxes (100).

13 Claims, 25 Drawing Sheets

METALLIC PROFILE FOR THE COMPOSITION OF STRUCTURES FOR THE ASSEMBLY OF CABINET/ENCLOSURES

TECHNICAL FIELD

More specifically, this Invention refers to a singular accomplishment in the geometry of a metallic profile especially developed for the assembly of structures normally used in a wide variety of types of cabinets/enclosures, which are also known as panel boards, and are actually metallic boxes (cabinets) with doors and side closings used to house a very large variety of components and electric and electronic devices.

STATE OF THE ART

As is known by those skilled in this art, at present there are different types of cabinets/enclosures also called switchboards, panel boards or boxes, designed to contain various components and electric and electronic devices in a very wide variety of fields of activity, including the telecommunications sector.

Hence in different situations of electrical distribution or assembly of components and electric and electronic devices, the use of a box, cabinet or panel is extremely important.

Although there is a very wide variety of cabinets/enclosures nowadays, they are normally metallic boxes with adequate closings, including one or more doors, depending on their size. Such closings, including the doors, are usually made of substantially thin metallic sheets. Thus all the cabinets/enclosures accommodate a structure of metallic profiles. This structure, as the name itself implies, constitutes the means of support for the parts that form the outside walls of folded sheets, and also constitutes the means of support and assembly of the doors and their respective hinges. Furthermore, this structure, although on the inside, also configures the struts required for the distribution and assembly of the different components and electric and electronic devices.

It is obviously essential for the interior of every panel board to have a substantially resistant structure to characterize a cabinet or box suitable for the internal equipment to be installed.

At present there are different types of structures, all obtained with metallic profiles, which in most cases are shaped in sheet bending presses, which hinders the productive process and presents some technical restrictions.

On the other hand, there are also other types of metallic profiles shaped in profile machines, such as those exhibited in the following documents: a) PI 8.406.283—rack board for a distribution cabinet filed on Dec. 7, 1984; b) DE 19536950 of Oct. 4, 1995—referring to a profile structure; PI 9.509.578-0—published on Dec. 23, 1997—rack for a distribution cabinet; c) PI 9.712.778-7—published on Oct. 19, 1999—squared profile for square structure of a distribution cabinet; d) PI 9.509.594-2—published on Sep. 30, 1997—rack for a distribution cabinet; e) PI 9.708.041-1—published on Jul. 27, 1999—distribution cabinet with a panel structure; f) PI 9.712.779-5—published on Oct. 19, 1999—distribution box and BR P.I. 0201155-7—profile for shaping of structures for cabinets/enclosures filed on Mar. 3, 2002.

Thus most of the profiles listed above and others are usually of the tubular type and are consequently closed, defining a tubular core, with one or more flanks or extended sides. The tubular part and the extensions have rows of holes and cutouts of different shapes, not only to fix the components and electric and electronic apparatus, but also for other details that are an integral part of the set, such as the door hinges.

It is important to emphasize that the current panel boards, cabinets/enclosures or boxes are also designed to attain two TYPES of application, defined commercially as: INDOOR type (sheltered use) and OUTDOOR type (unsheltered use—exposed to the elements). The difference between the two types consists basically in the DEGREE OF MECHANICAL PROTECTION AND SEALING of the side closings and of the doors, consequently we can say that those defined as the outdoor type present a higher degree of mechanical protection and sealing.

The indoor type is traditionally considered adequate for use in a closed environment protected from the elements, while the other type defined as outdoor is ideal for use in open places or in the open air, such as in the case of some cabinets/enclosures used in the telecommunications sector. However, the outdoor type, due to its greater degree of sealing, is also used to an advantage in closed environments but with hostile activities, not only on account of the presence of pollutants suspended in the air but also due to the presence of humidity, which is the case of industries, environments for processing sundry products, notably in the chemical sector, industrial kitchens and/or other similar locations.

INCONVENIENCES OF THE STATE OF THE ART

At present, as mentioned above, there are numerous profiles for the assembly of structures, and in most cases, the structural effect obtained is truly satisfactory. However, as far as seals are concerned, they require special technical embodiments depending on the application, and they also present complicated industrial workability, since like what happens in the profile described in the aforementioned document (PI 8.406.283)—rack board for a distribution cabinet filed on Dec. 7, 1984, it is used exclusively for the assembly of indoor cabinets/enclosures.

Solely to elucidate the state of the art more adequately, we present the attached FIG. 19, which corresponds to FIG. 13 of PI 8.406.283, where one can verify a cross section highlighting the profile used and in this case, typically exhibiting a critical problem that serves as a standard example with respect to sealing between the internal environment of the cabinet and the external environment.

In FIG. 19 we can observe that the profile is of the type defined by a square tubular core (10), with two extended opposite vertexes (12-15). The tubular part of the square section and the extensions have rows of holes and cutouts (20-21-23-51) of different shapes and dimensions, not only to fix and assemble the internal components and electric and electronic apparatus, but also other external components that are an integral part of the set, such as the door hinges, closing panels and/or others.

In relation to the same FIG. 19 attached, it can be observed that the holes and openings (20-21-23-51) are distributed on the four sides of the tubular core (10). Consequently different points of communication are established between the internal and external environment of the cabinet. In this manner, the sealing promoted by the actual construction of the profile is completely destroyed, which makes the application of the structure when it is for use in an outdoor cabinet unfeasible On the other hand, in relation to the same FIG. 19, it can be noted that the geometry adopted for the profile construction permits the limited use of sealing components (72), notably those used on the doors and closing panels. Furthermore, this sealing (72), in its general lines, is jeopardized by the holes (20-21-23-51).

On the other hand, taking into consideration the geometry of the aforementioned profile, the sealing (72) is of the cord type, which can be applied in different ways, by gluing or by deposition of material applied directly on the closing panel or door, thus generating other disadvantages, mainly a higher cost, besides which the sealing will always be an integral part of the closing panel or door and, due to the flexibility of such parts, the sealing pressure is not always uniform. Another problem noted is that in the event of possible damage to such seals, the repair implies the substitution of the closing panel or door.

Thus, in brief, we can say that the inconveniences of the profiles of the state of the art are generated according to the geometry adopted for them, and by the different openings applied to their walls. Hence the objectives are not attained by the assembly to meet the conditions of use for the outdoor type.

OBJECTIVES OF THE INVENTION

In view of the foregoing circumstances and with the objective of overcoming them, this invention was created and in its final embodiment an IMPROVED profile was defined with a new transversal geometry, especially developed to simultaneously cater to the assembly of structures for cabinets/enclosures of the indoor and outdoor type, including a series of technical and practical advantages, with an emphasis on the following:

a) the profile presents a core in the form of a square tube, where two opposite vertexes are extended in the form of rims, each one including a fold in a straight angle, whereas this tube or tubular core presents one of its vertexes facing the inside of the cabinet, where only its two adjacent sides are emptied by rows of openings for the fixing and distribution of the electric components, while the two opposite sides of the same tubular core, those facing the outside of the cabinet, are completely closed and without any openings. However, only one of their sides includes a loop of folds forming a third rim perpendicular to this side, with which the part of the profile facing the outside of the cabinet totals at least three rims and two ends folded in a straight angle, consequently forming different anchoring points for the various devices used in the final assembly of the cabinet or panel board, such as: closings and doors;

b) the outside of the profile is completely sealed in relation to the inside. This sealing is naturally obtained with the actual transversal geometry of the profile in conjunction with the profiling details, i.e., if we divide the profile diagonally exactly at the tubular core, one side or the inside of the cabinet is defined by a vertex and two adjacent walls, both emptied for the assembly of electric equipment inside the cabinet; while on the opposite side, the other vertex and its two adjacent walls have no holes or openings whatsoever, consequently there is an isolation or natural sealing of the actual profile geometry, thus isolating the internal environment of the cabinet from the external environment, hence in this first descriptive step, we can say that the same profile meets the assembly conditions of cabinets/enclosures of the indoor and outdoor type advantageously;

c) the external rims were strategically positioned, two of which with terminals folded in a straight angle, which permits the use of a type "a" gasket, which in reality is a type of rubber profile for static use, and, in this condition, both the sealing of the doors and of the side closings are applied by simple fitting directly in the perimeter contouring the structure, characterizing sealing points completely different from conventional cabinets/enclosures, whereas the rubber profile promotes other advantages, i.e., it is positioned by means of simple fitting, which consequently accelerates the entire assembly process. Additionally, in the case of maintenance, one simply has to remove one and fit the other, which can be done very quickly without interrupting the operation of the cabinet;

d) the transversal geometry of this improved profile has made a new technical effect of extreme importance possible. All the sides of the assembled structure are symmetrically equal, which is extremely favorable to the interconnection of one structure with another on any one of the sides, including the top and bottom sides. Hence this profile permits the formation of modular structures that can grow or decrease when desired; and e) the three outside rims combine to permit, as mentioned above, the fixing of different components, such as: closing panels, doors (hinges), rubber sealing profile and/or others. Furthermore, an important detail is the geometry of the set of rims, which besides significantly increasing the mechanic resistance of the profile, also significantly favors the mechanical interconnection between one structure and another from any of its sides, thus completing its advantageous characteristics, including that of the modularity of the set.

First New Technical Effect

In the profile in question and in its preferred embodiments, the main objective was to define a symmetrically combined geometry between the outside and the inside of the cabinet. Thus, taking into consideration the fact that the profile in question presents a part or soul defined as a central core in the form of a square tube, the geometry adopted was simply prepared so that a part (walls) of the core could offer a perfect degree of sealing in relation to the other side, i.e., considering that the core is a square tube, and considering a dividing line on the diagonal, we will have one of its vertexes and its respective walls facing the inside of the cabinet, while the other vertex and its respective walls remain facing the outside of the cabinet. Hence the walls facing the inside of the cabinet have rows of holes and cutouts of different shapes and dimensions, for the fixing and assembly of the internal components and electric and electronic apparatus. This does not apply to the other two walls facing the outside of the cabinet, since neither one has any opening. Consequently the integrity of the natural sealing of the tubular core of this profile is maintained.

Second New Technical Effect

To attribute special characteristics to the vertex facing the outside, the one positioned opposite to the internal vertex. Generally speaking, this external vertex constitutes one of the most important aspects of the improvement in question and of its preferred embodiments.

Therefore this external vertex was extended in the form of an assembly rim. In general, this rim can have a double or triple wall, and can be oriented to the outside, preferably in angles of 90 degrees and in a radius of 270 degrees limited by the two adjacent walls of this external vertex. This rim can be emptied by rows of openings of different shapes and sizes, forming various fixing points, which, added to the fact that said rim can be oriented in different angles, allows it to meet different technical requirements of assembly of external components, such as: fixing of doors, fixing of panels, assembly of accessories for the interconnection between two cabinets/enclosures and/or others.

As one can perceive, this external rim makes the profile rigid and constitutes a point that is completely isolated from the inside of the cabinet, thus not interfering in the sealing naturally obtained with the profiling of the profile, i.e., the integrity of the sealing between the internal and external environments of the cabinet is maintained untouchable, thus offering means for this profile to be used simultaneously for the assembly of indoor and outdoor cabinets/enclosures.

Third New Technical Effect

Create other strategically positioned rims, which are natural extensions of the two adjacent walls of the internal vertex, so these rims can also have their free ends perpendicularly folded to the outside or to the inside, thus forming different assembly points, as mentioned above, for "a" type seals and other types of seal.

These complementary rims, depending on the angle of the fold applied to their ends, constitute details for different applications, i.e., we presume that one of the rims has its end folded perpendicularly to the outside, and that this profile is positioned in the bottom or top part of the cabinet. In this condition, the rim would form a square like a frame to support the bottom or top of the cabinet, thus eliminating the use of complements for the fixing and support of such parts of the cabinet. Furthermore, when necessary, this rim would also provide conditions for the configuration of a complementary compartment in the bottom part of the cabinet.

DESCRIPTION OF THE DRAWINGS

For a better understanding of this Invention, we present below a detailed description thereof, referring to the attached drawings, where.

DETAILED DESCRIPTION OF THE INVENTION

Figure 1A:
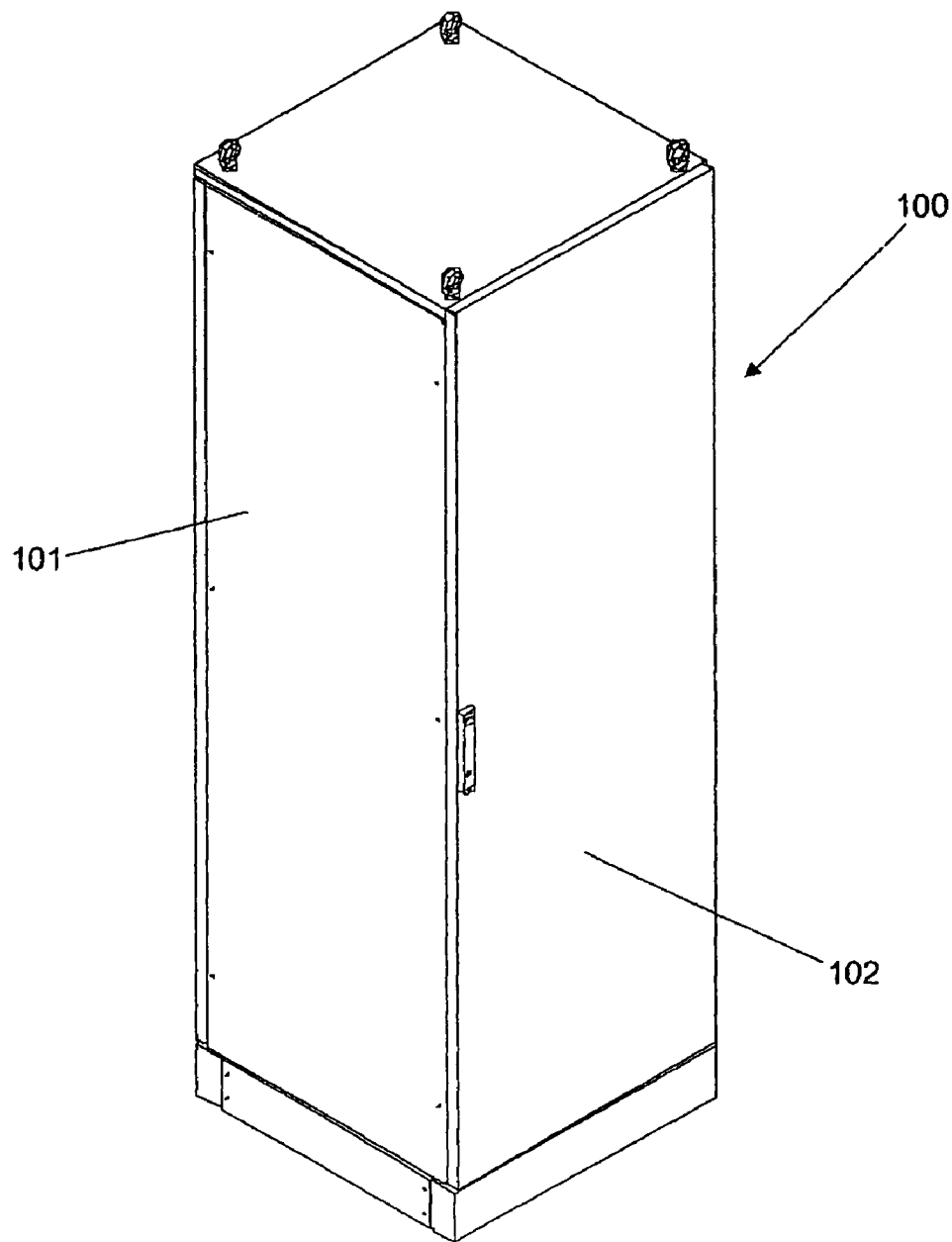
FIG. 1A represents a view in perspective, showing a completely closed cabinet obtained with this profile.
Figure 1B:
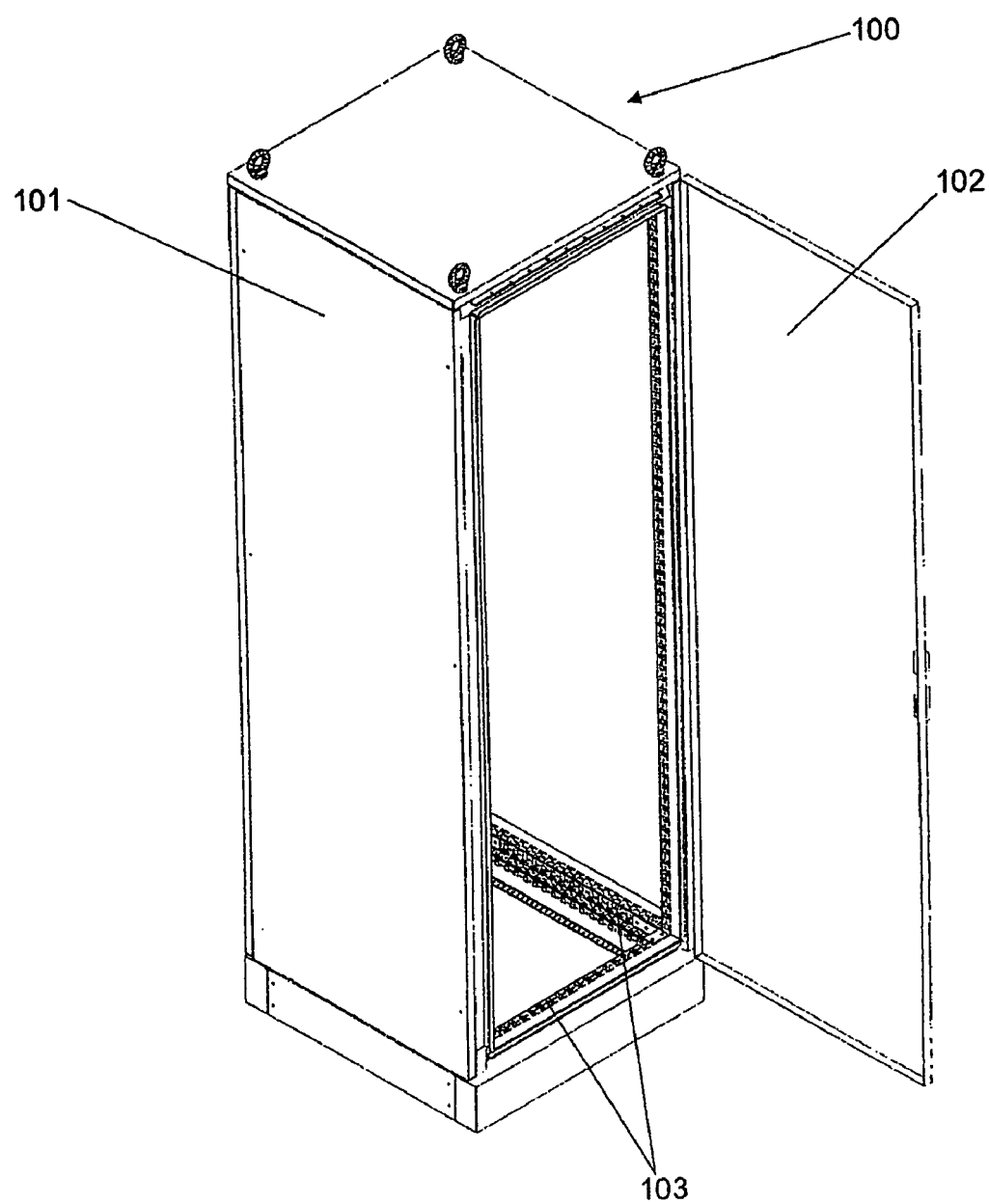
FIG. 1B exhibits another view in perspective of the same cabinet, although with its door open.
Figure 2:
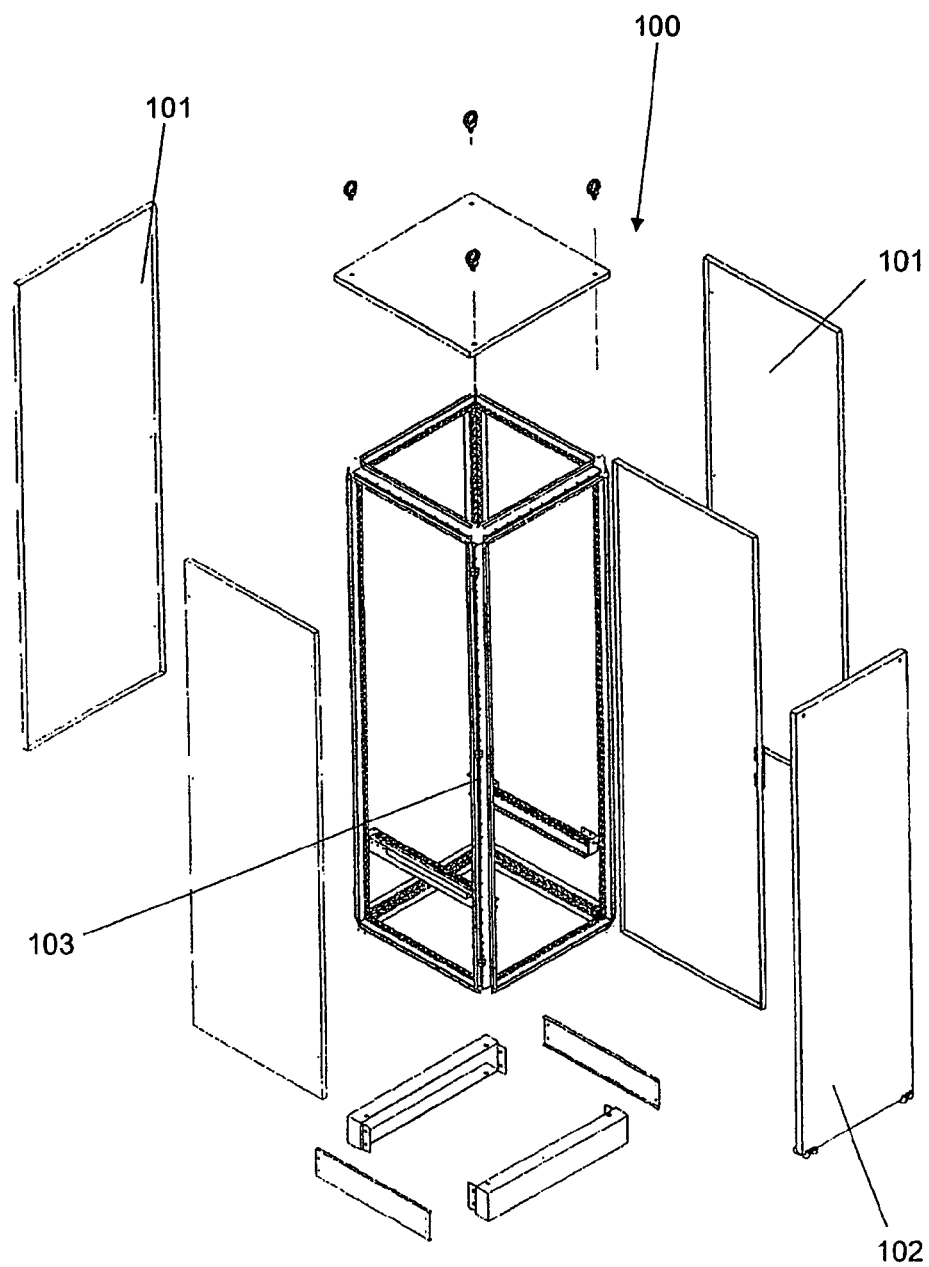
FIG. 2 is an exploded view in perspective of the cabinet exhibited in the foregoing figures, highlighting its structure obtained with this profile.

In accordance with these illustrations and in their details, this improved profile was especially developed for the assembly of cabinets/enclosures, boxes or cabinets/enclosures (100) generically illustrated in FIGS. 1A, 1B and 2, where one can verify a merely exemplifying type, which can be of indoor or outdoor use. However, in both cases it is presented in the form of a metallic box with side closings (101), including one or more tilting doors (102), depending on its size. These closings, including the doors, are normally made of substantially thin metallic sheets. Therefore all the cabinets/enclosures house a structure of metallic profiles (103), also illustrated in FIG. 3, where it can be verified that this structure, as the name itself implies, constitutes the means of support for the parts that form the outside walls of folded sheets, and constitute the means of support and assembly of the doors and respective hinges, as well as other accessories not illustrated here, whereas, the inside of this structure also configures the necessary struts for the distribution and assembly of the different components and electric and electronic devices.

Figure 3:
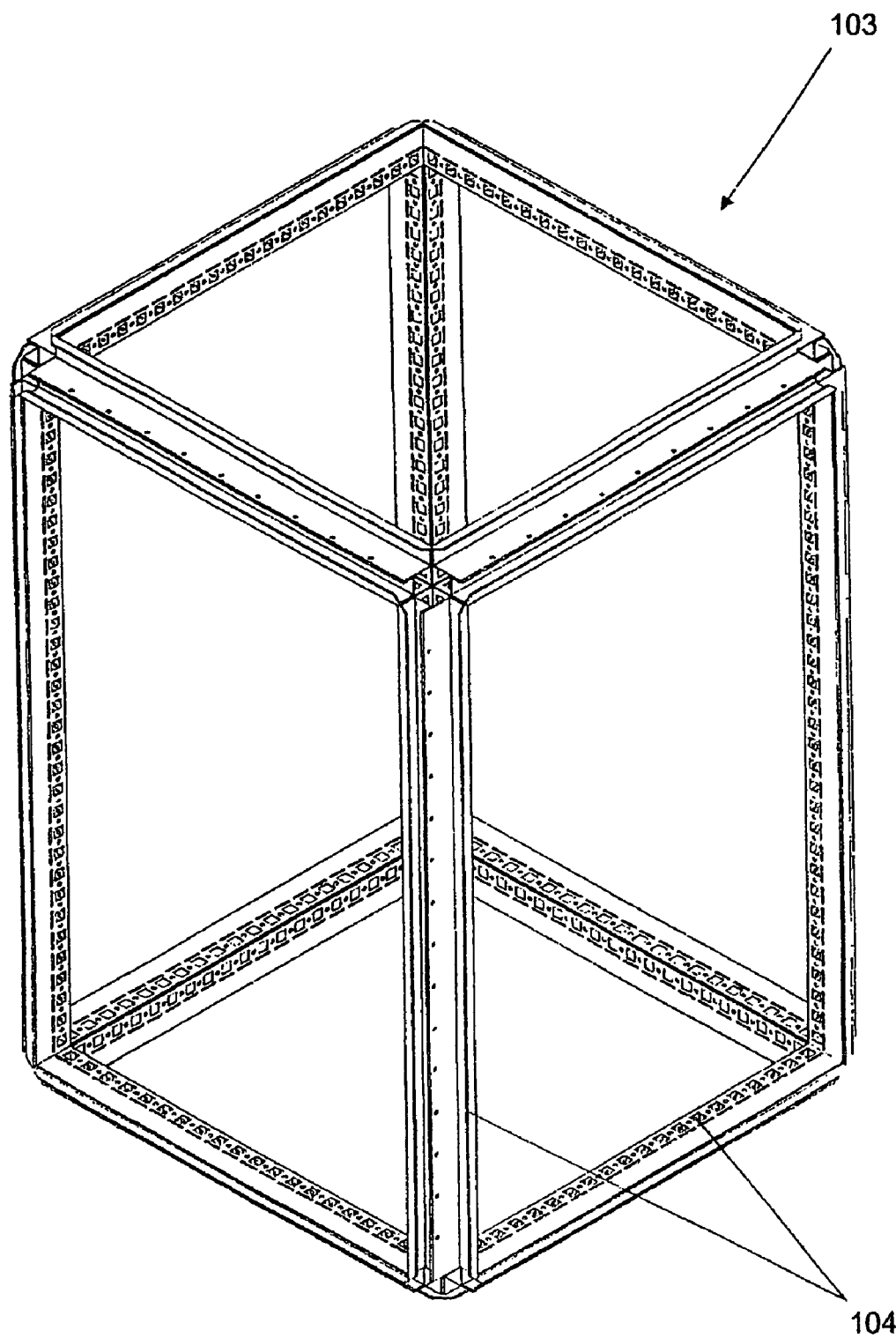
FIG. 3 exhibits a view in perspective of a structure obtained with the profile in question.

Also in relation to FIG. 3, it is obviously essential for the inside of any cabinet to house a substantially resistant structure (103), to characterize a cabinet or box suitable for the internal equipment to be installed. This illustrated structure is obtained with this profile (104), seen in detail in FIG. 4, where it can be verified that it consists of a cross section with a new geometry, defined by a central core in the tubular shape with a quadrangular section (105), where the vertex (106) (FIG. 5) is oriented to the inside of the cabinet (100), while the opposite vertex (107) is oriented to the outside of this cabinet (100), and these two vertexes are formed by single walls, which is not the case of the other two remaining vertexes (108) and (109), which are defined by the junction of the sheet that forms the first two vertexes (106-107) and, from this point on, the double walls (110) are extended in a coplanar position in relation to the adjacent walls (106a-106b) of the vertex (106), forming opposite rims (111a 111b), whose ends are perpendicularly folded forming short ends (112) and (113) that, besides being grooved (114), are also distanced in parallel from the adjacent walls (107a) and (107b) of the vertex (107), whose wall (107a) also includes a projection perpendicularly oriented to the outside, configuring a perpendicular rim (115).

Figure 4:
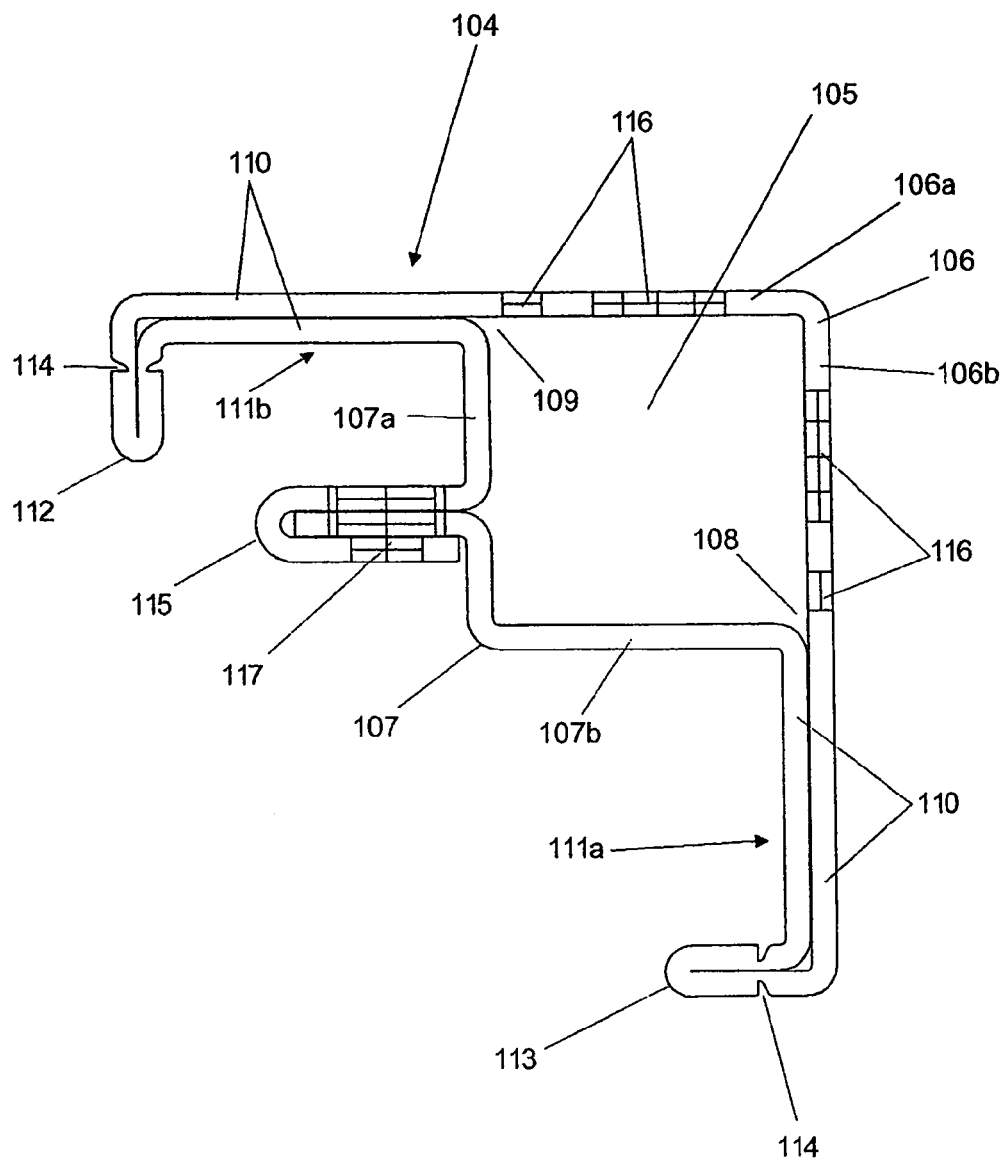
FIG. 4 exhibits the cross section of this profile in accordance with a preferred constructive version.

In relation to FIG. 4, the adjacent walls (107a) and (107b) which are located outside of the cabinet (100) are completely blind.

The adjacent walls (106a) and (106b) located inside the cabinet (100) distribute rows of openings and holes of variable shapes and dimensions (116), which constitute the fixing points of different components that are assembled inside the cabinet.

The rim (115) is emptied by rows of variable holes and openings (117) for fixing components outside the cabinet (100).

Figure 5:
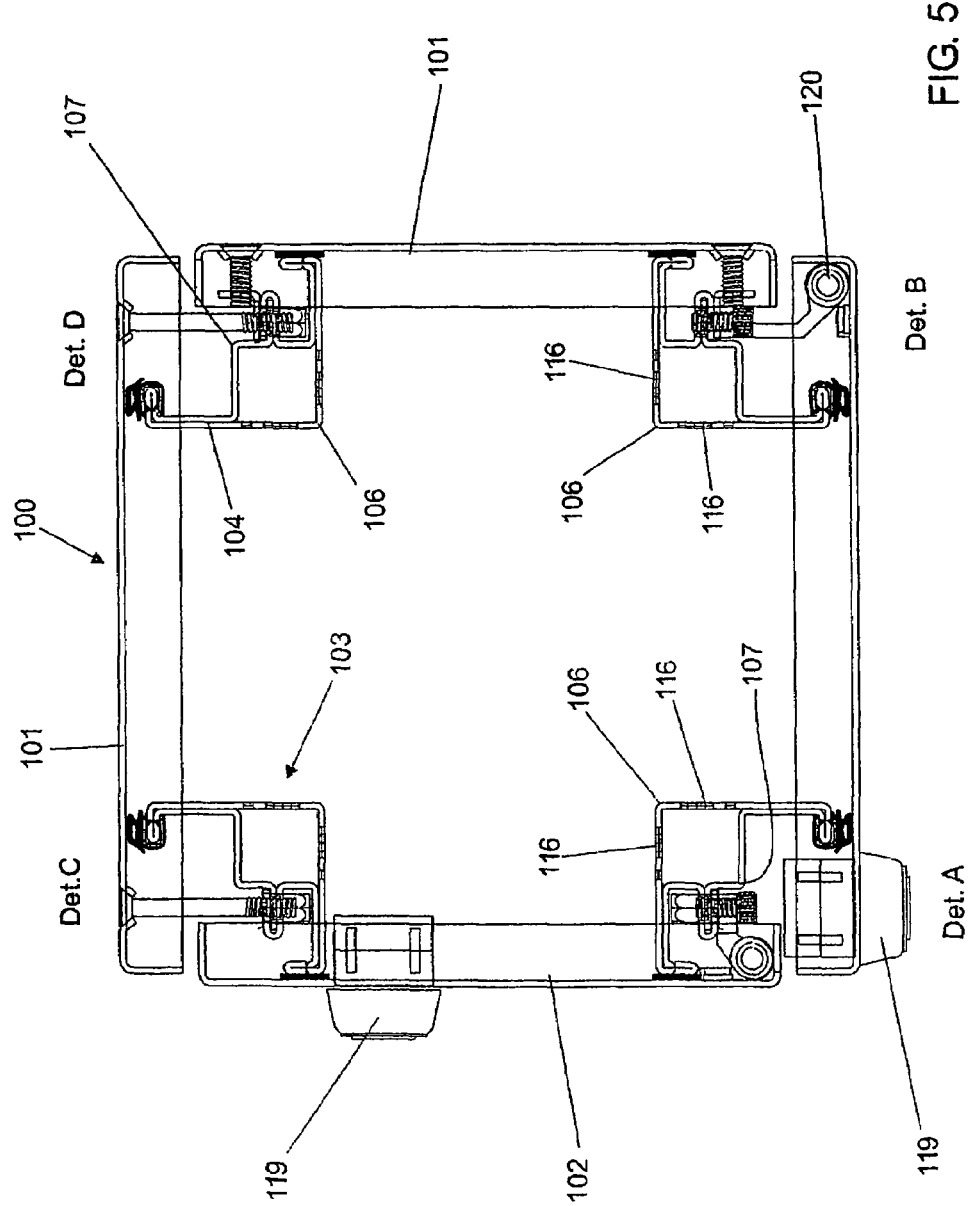
FIG. 5 illustrates a view of the cross section of a cabinet obtained with this profile.

By observing FIG. 5, it can be noted that the vertexes (106) of the structure (103) are all facing the inside of the cabinet (100), which also applies to the openings (116), while the other side of the profile, the one defined by the vertex (107), is facing the outside of the cabinet (100) and, in this condition, since the walls (107a) and (107b) are blind, a natural sealing occurs between the inside environment of the cabinet and its outside, considerably increasing the efficiency of the set. Thus the same structure (103) is used for the assembly of cabinets/enclosures of the indoor or outdoor type.

FIG. 5 exhibits a top view and a cross section of a cabinet obtained with the present profile. In this figure, the corners have been exaggeratedly dimensioned for a better view of the constructive details, although this does not interfere in the construction of the details involved in the present improvement.

Figure 6:
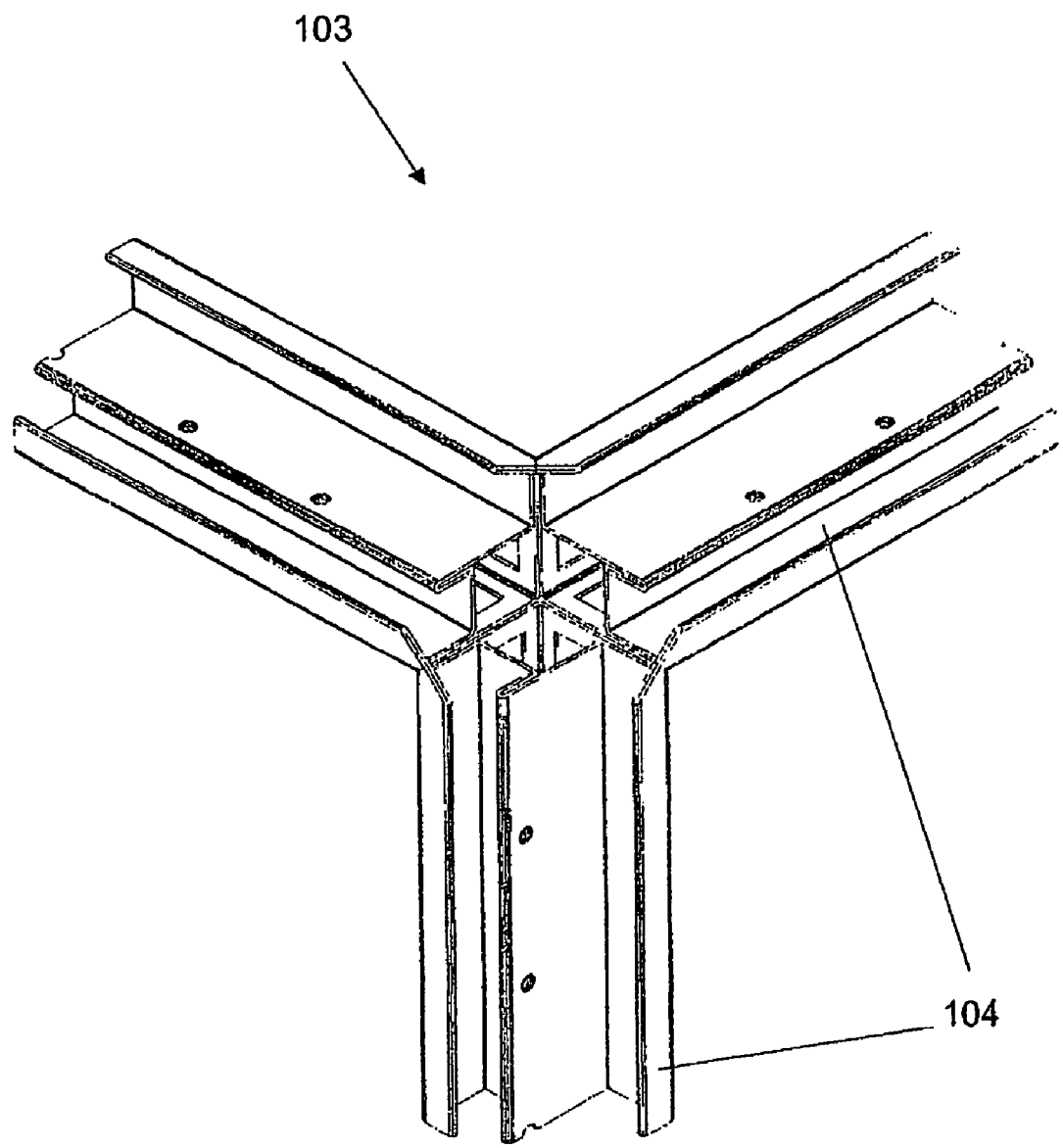
FIG. 6 exhibits a partial and enlarged view in perspective of the structure shown in FIG. 3.

By observing FIG. 6, we can observe that another important feature of the profile in question is obtained when several of them are joined perpendicularly, i.e., when their ends are joined perpendicularly, all those rims (111ab) and (115) face the outside and combine for all the sides of the structure (103) to be symmetrically equal, including the top side and the bottom side, hence they can (see FIG. 5) receive the closings (101) and doors (102), whose fixing points are illustrated in FIGS. 7, 8, 9 and 10, which are expanded details of FIG. 5.

Figure 7:
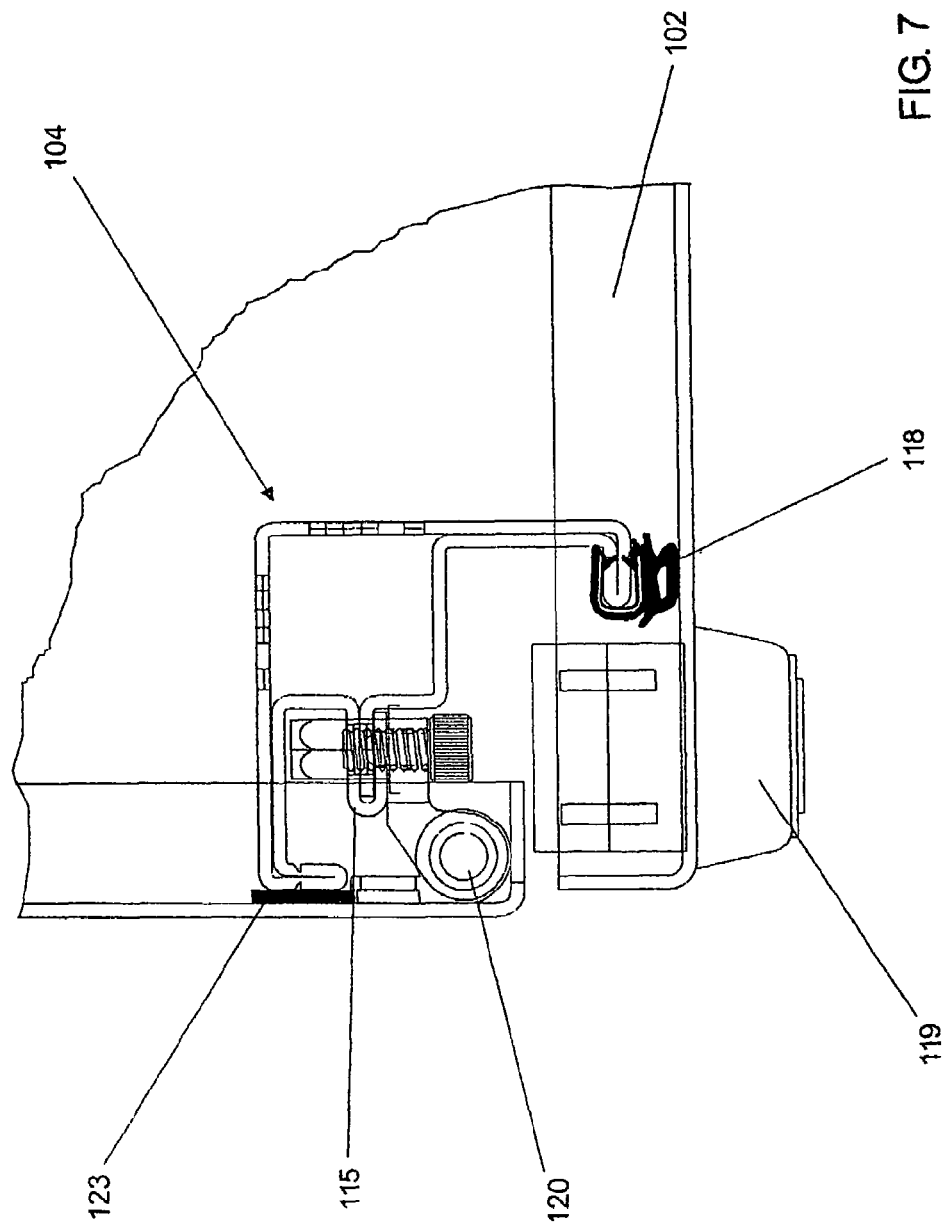
FIGS. 7 to 10 are enlarged views of details A, B, C and D indicated in FIG. 5.
Figure 8:
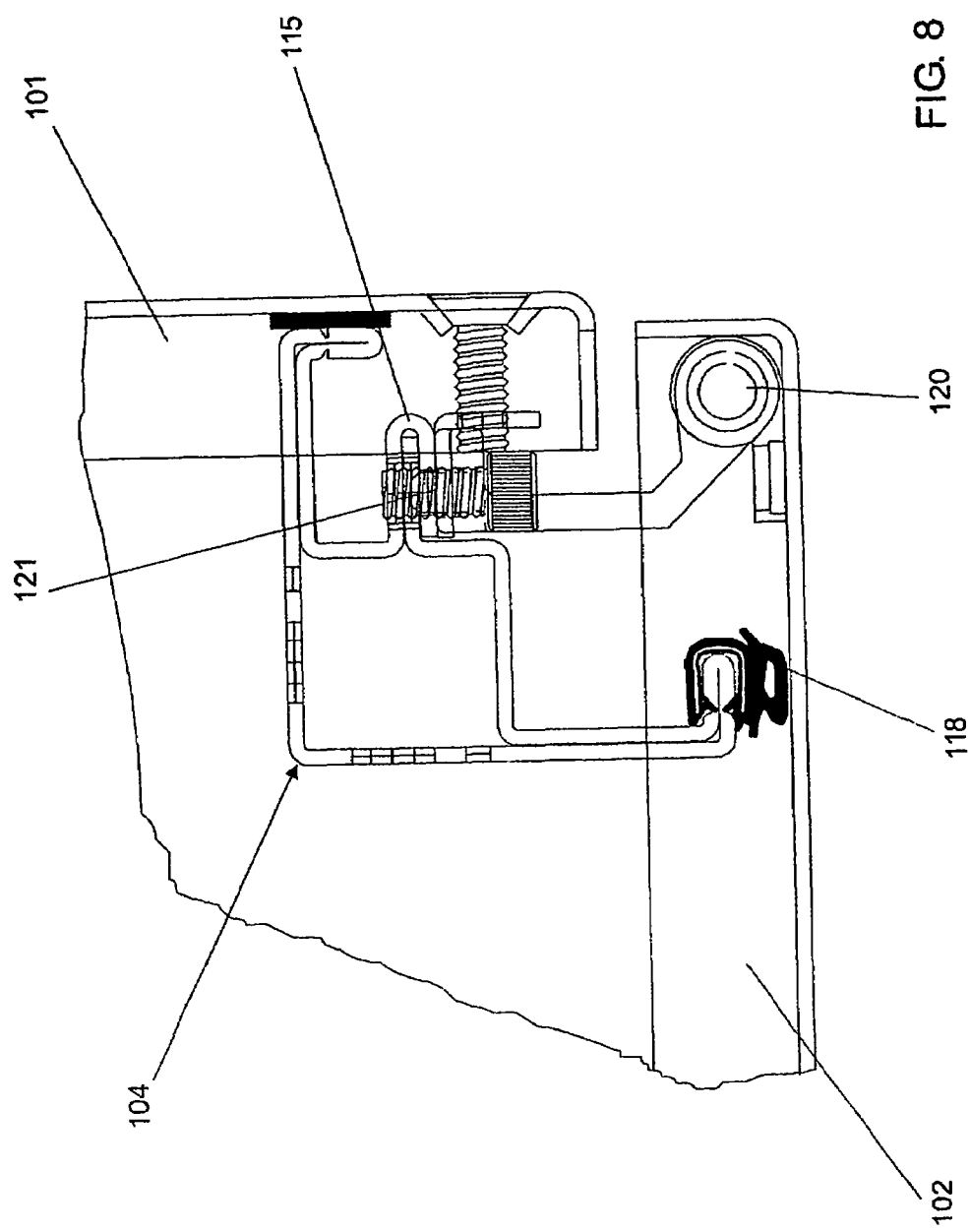

By observing FIGS. 7 and 8, which are the expanded details "A" and "B", the folded ends (113) configure a fitting rail for an "a" type gasket (118) of leaning for the door (102) with its respective usual lock (119) on one side and usual hinge (120) on the opposite side, whereas the latter meets the fixing point (121) at the corresponding emptied rim (115).

Figure 9:
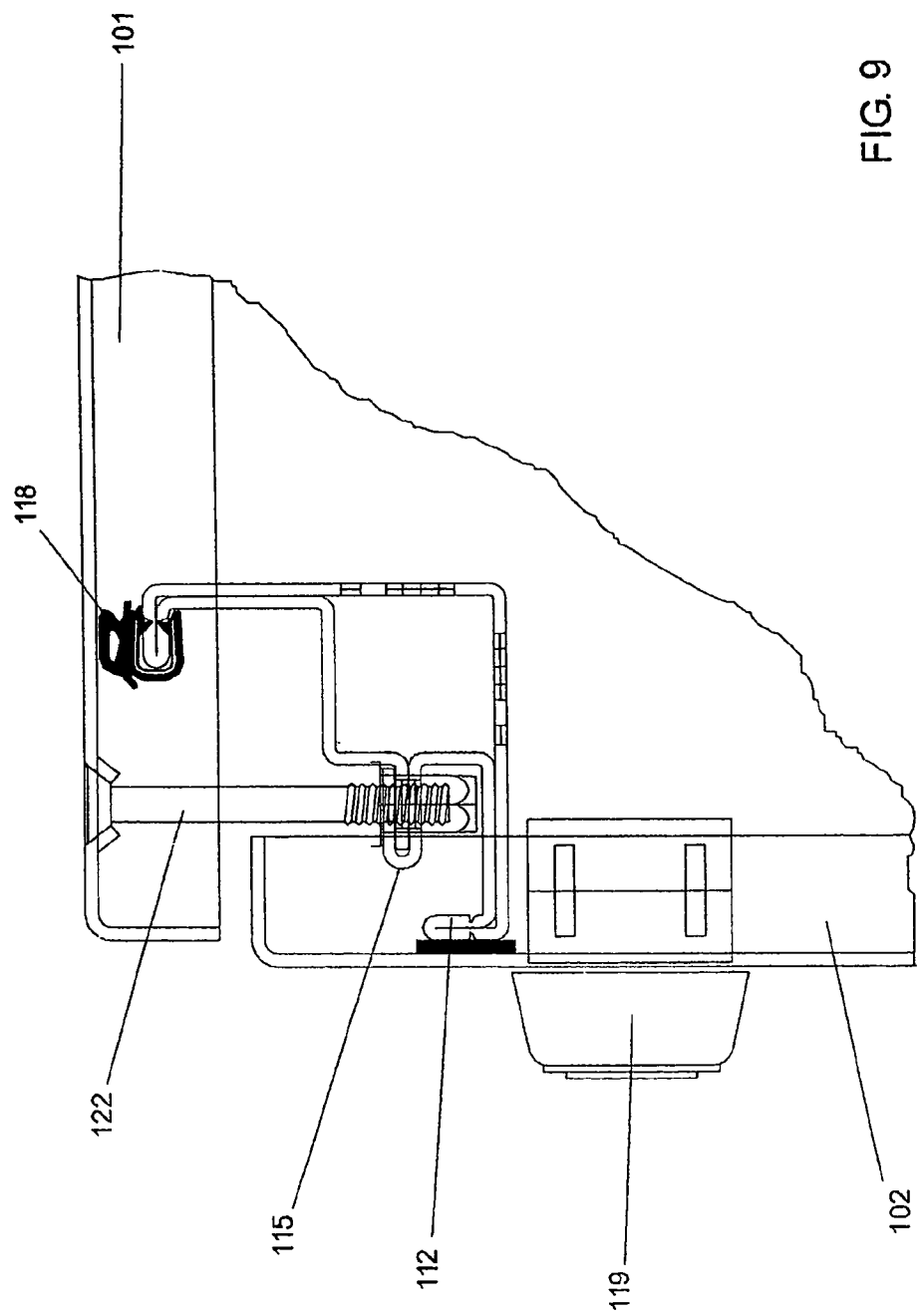
Figure 10:
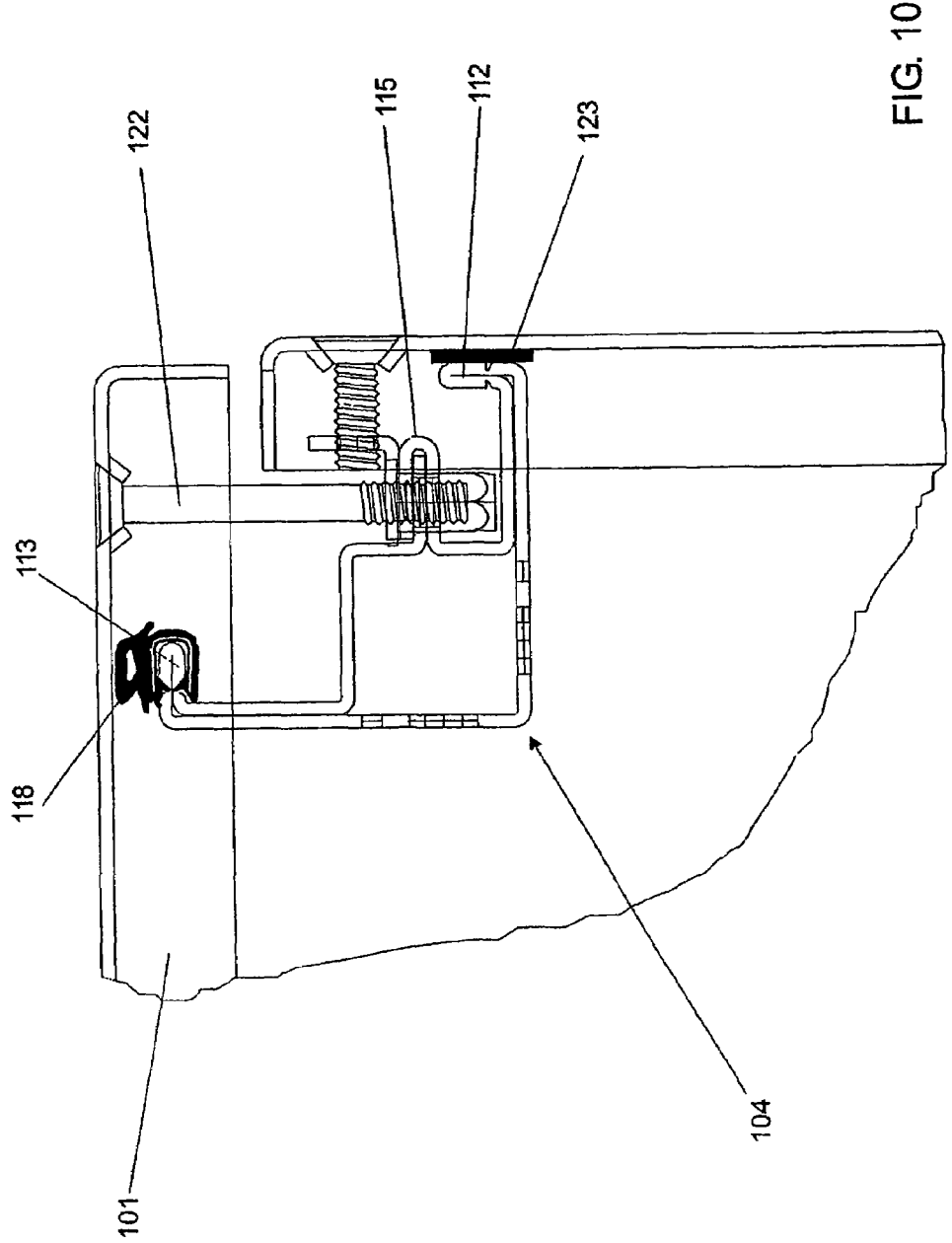

In relation to FIGS. 9 and 10, the same rims 115 configure fixing points for the use of screws (122) to fasten the closings (101), where the sealing uses a profile or "a" type gasket applied to the corresponding folds (113).

In relation to the foregoing FIGS. 9 and 10, the ends (112) configure flat props for a sealing cord (123), fixed on the inside of the closing (101) or on the actual front of the end (112).

Figure 11:
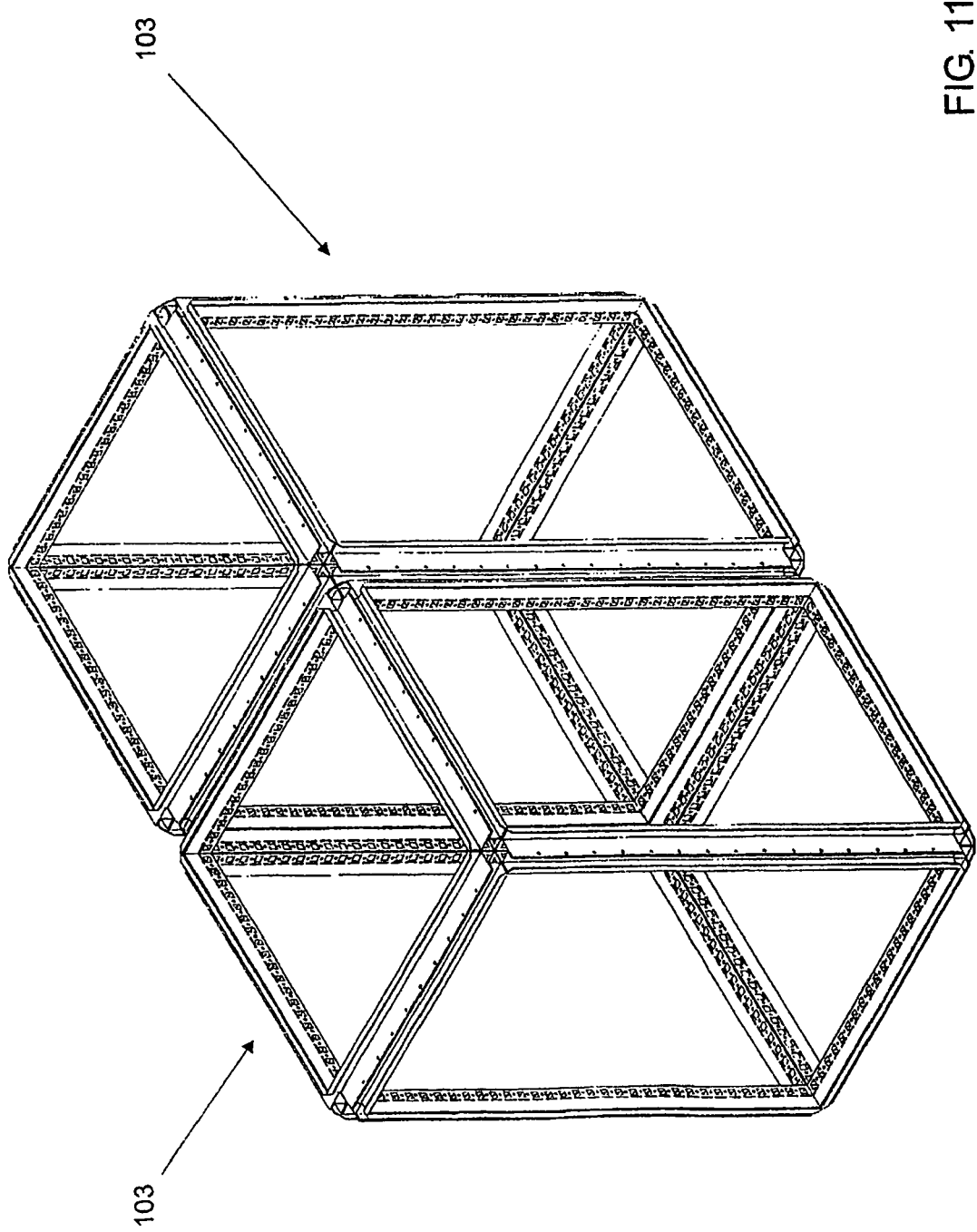
FIG. 11 is a view exhibiting two structures side by side, obtained with this profile.
Figure 12:
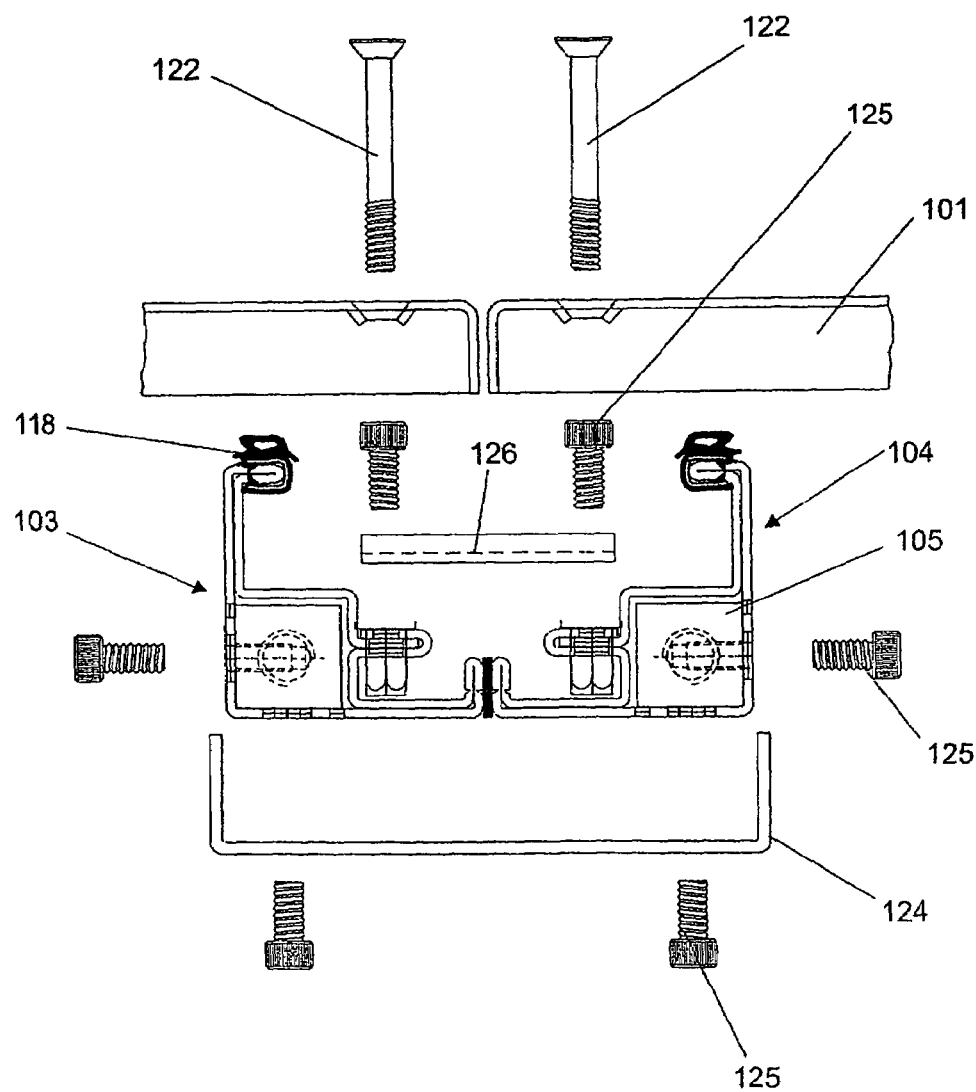
FIGS. 12 to 15 are views showing that the structures obtained with this profile can be interconnected from any one of their symmetrical sides.

As mentioned above, the present improved profile confers means for the construction of a structure (103) whose sides are symmetrically equal, characterizing modular units, as illustrated in FIG. 11. In this condition, it is possible to interconnect one unit with another, and for this purpose the profile in question receives compatible accessories for mechanical interconnection, exhibited in the exploded view of FIG. 12, where all the components adjust perfectly to the constructive details defined by the transversal geometry of the profile (104).

Figure 13:
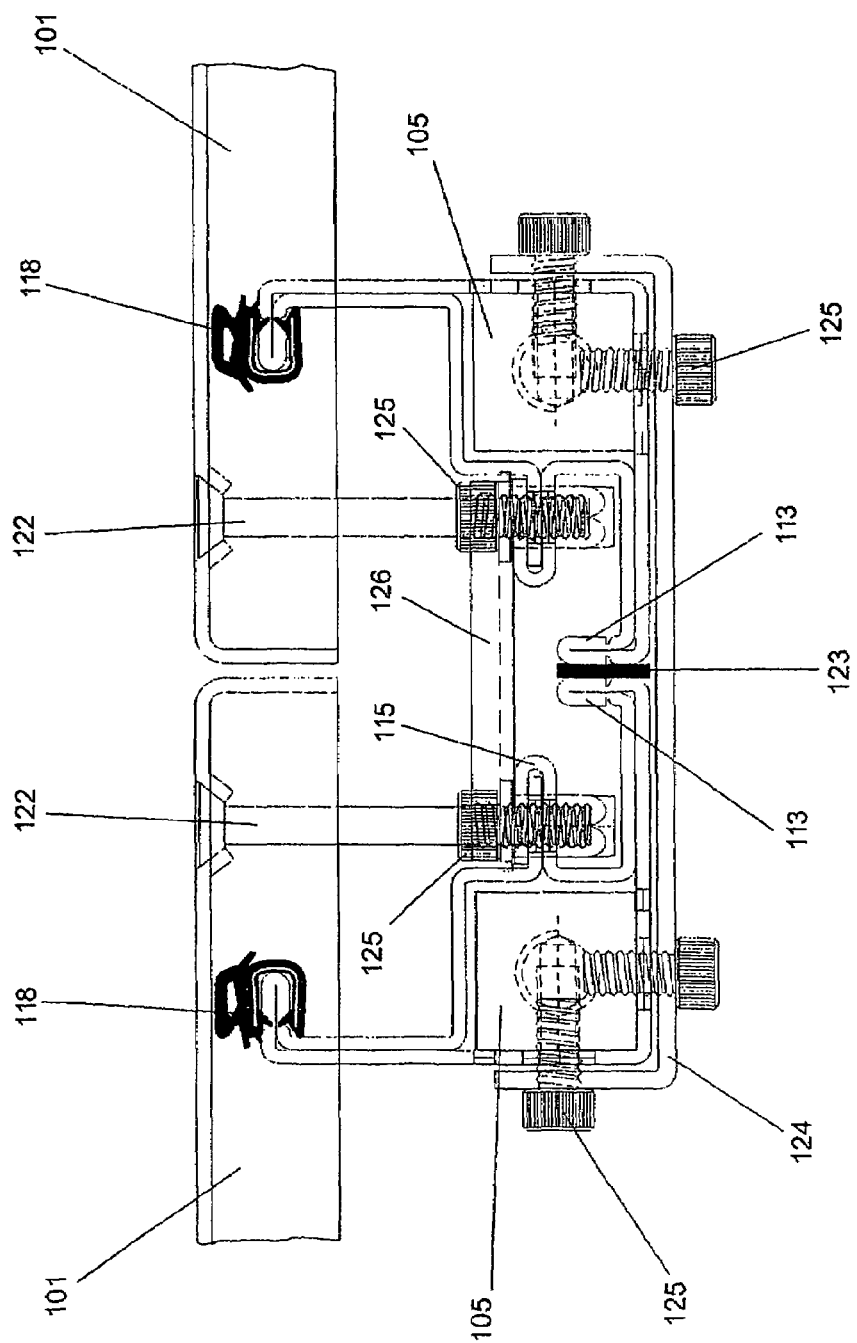

By observing the FIG. 13, we can note that two structures have been joined side by side, and in this condition, the profile is characterized by the fact that its ends folded in a straight angle (113) adjust in an opposed manner or side by side, with a sealing (123), in the middle, maintained with a certain pressure in conjunction with an accessory or flat bar bracket folded in "U" (124) which, in conjunction with screws (125), establishes a firm interconnection between the two tubular cores (105), whereas this interconnection is complemented by a rod (126) that also interconnects the two rims (115) with the use of other screws (125), thus finalizing the interconnection of two modules on the side with fixed closings (101), whose sealing occurs in the same manner as described above, i.e., with "a" type gaskets (118).

Figure 14:
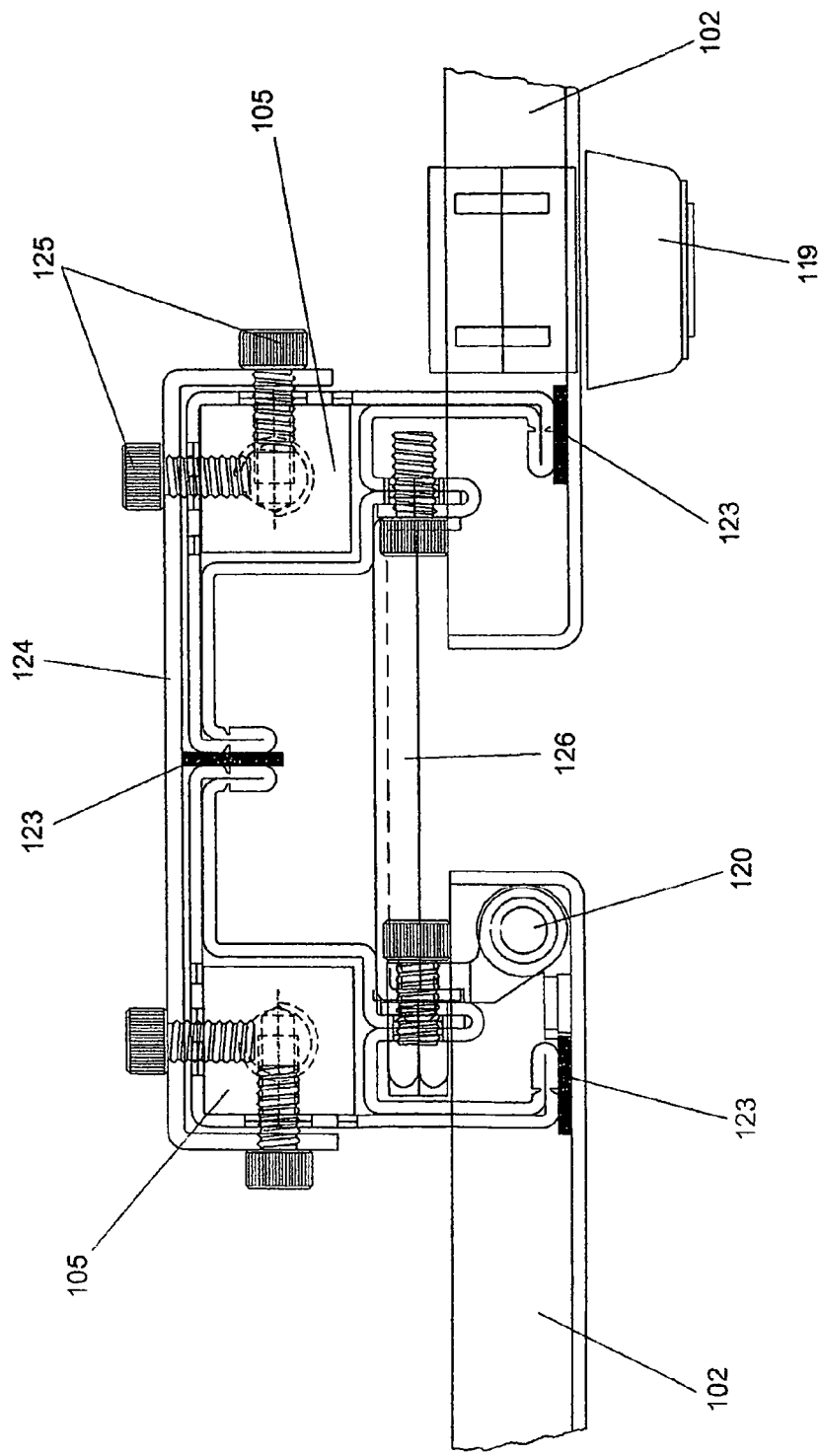

In relation to FIG. 14, it can be noted that the union of two structures on the sides of the doors (102) occurs in the same manner, i.e., using the seals (123), the studs or rods (126), bracket (126) and respective screws.

Figure 15:
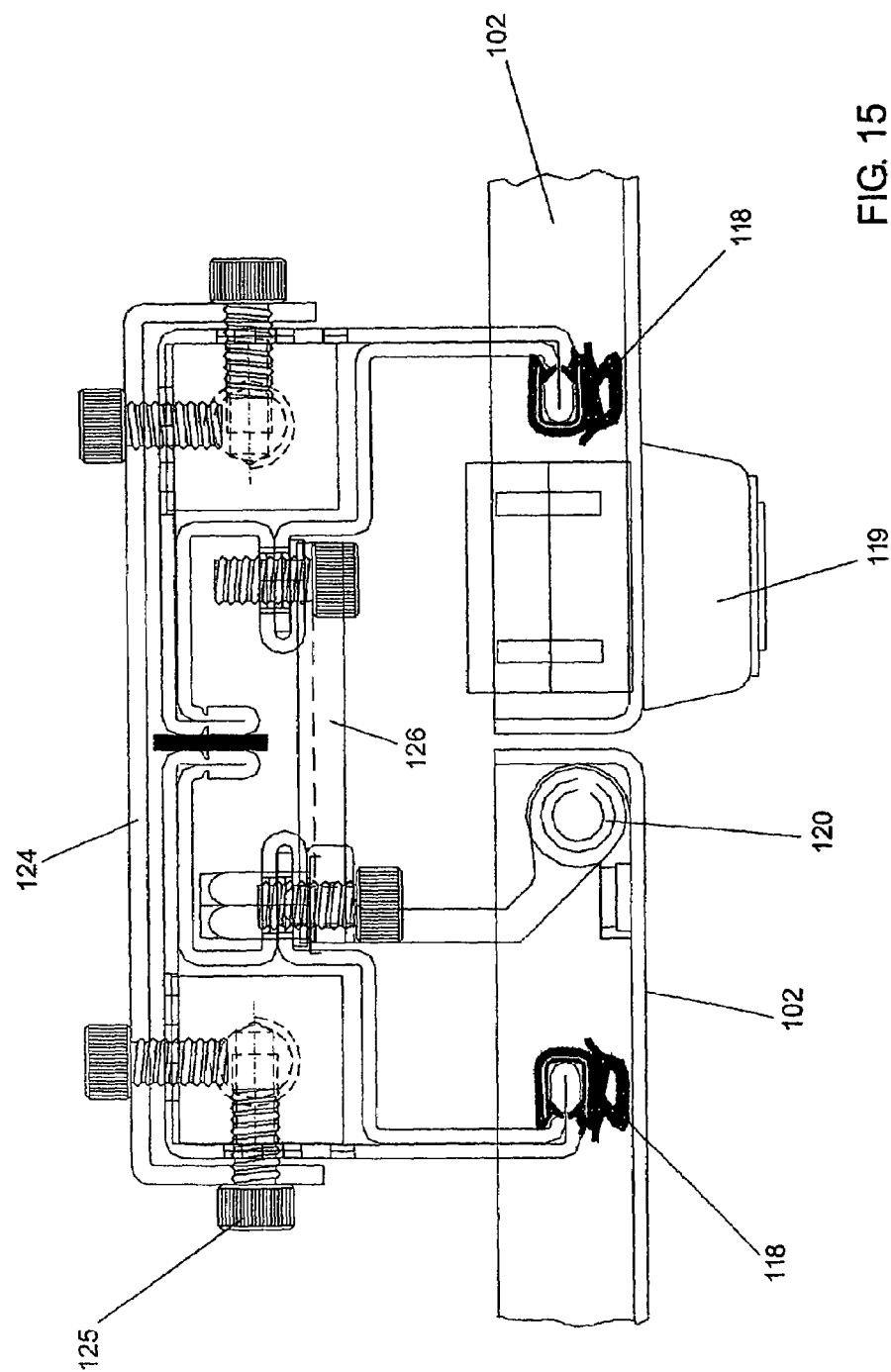

FIG. 15 exhibits an assembly situation similar to FIG. 14, highlighting the interconnection between two structures, which is where the two sides of the structures have tilting doors (102). However, in this case, the assembly of the lock (119), and of the respective hinges of such doors (102), are located outside the sealing perimeter of the gaskets (118), which adds more efficiency to the set in terms of sealing, making it ideal for the assemblies of outdoor cabinets.

First Preferred Embodiment

Figure 16A:
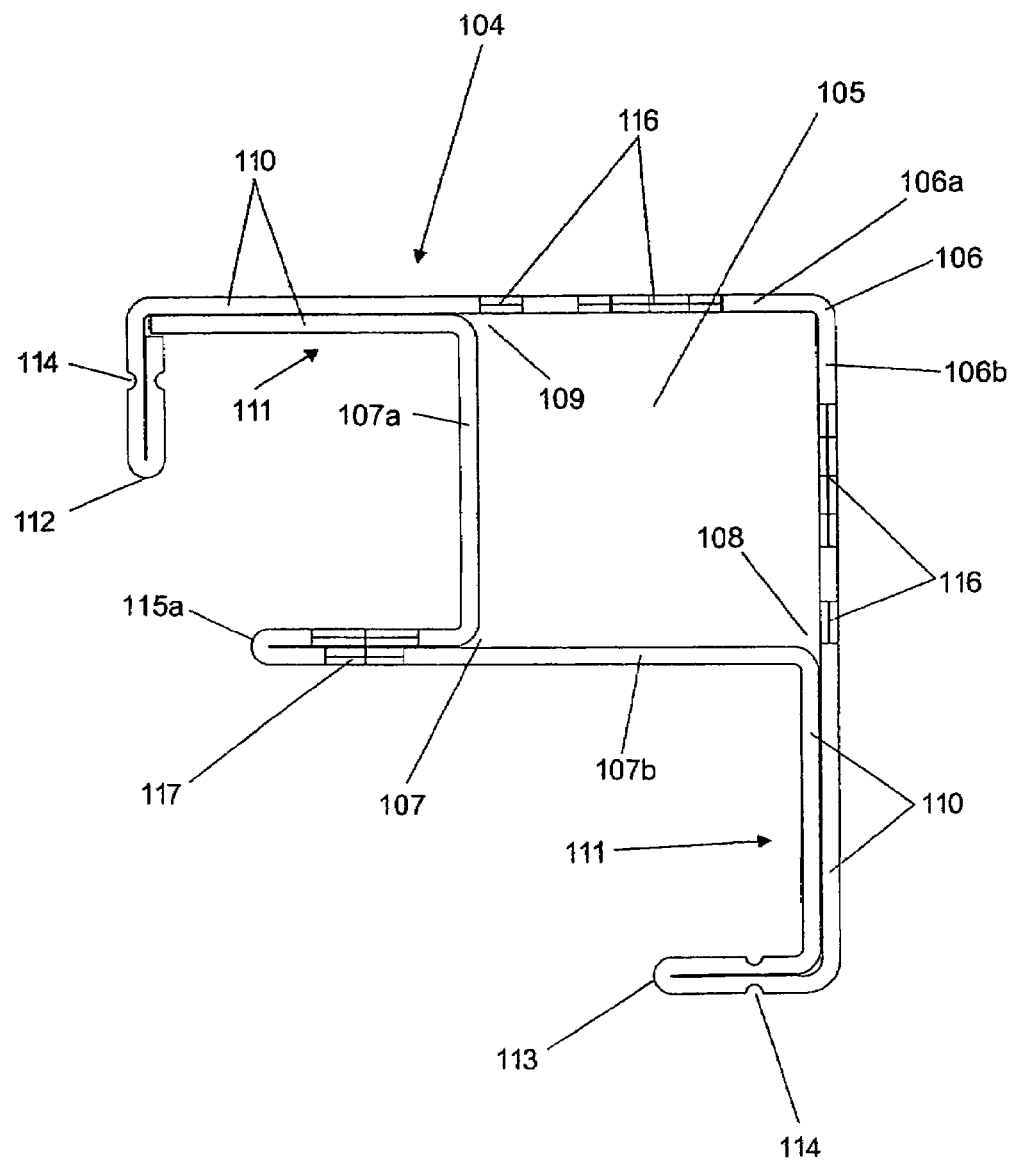
FIGS. 16A to 18B are views highlighting the preferred embodiments of this profile.

FIG. 16A exhibits the first preferred embodiment for the profile in question, maintaining practically the same transversal geometry although in this case it is characterized by the fact that its rim (15a) is formed at the exact point defined by the vertex (107), in a coplanar position in relation to the wall 107b and perpendicular to the wall (107a).

Second Preferred Embodiment

Figure 16B:
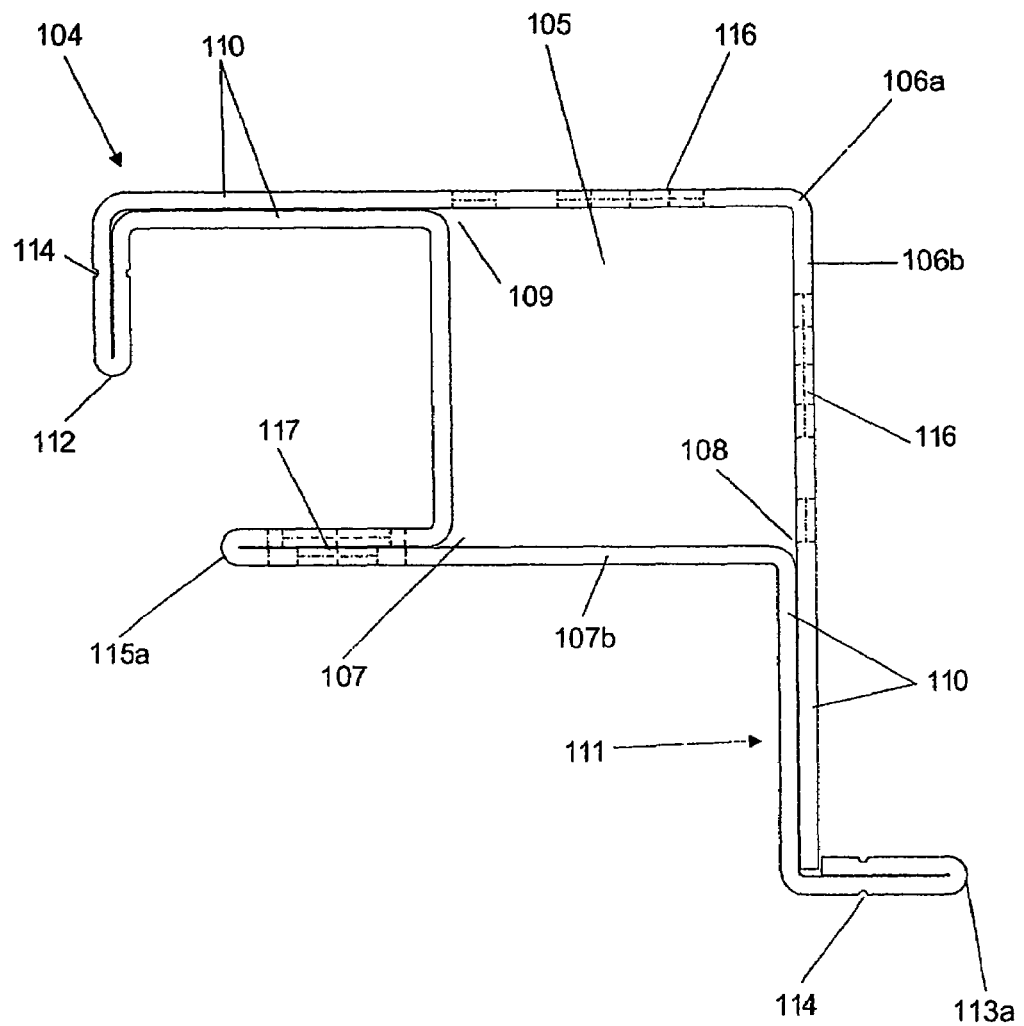

FIG. 16B exhibits the second preferred embodiment for the profile in question, maintaining practically the same transversal geometry although in this case it is characterized by the fact that its rim (111), formed by two walls (110), has its end or free edge perpendicularly folded outwards (113a). In this case, if this profile is positioned at the bottom or top of the cabinet/enclosure, the aforementioned rim or end (113a) forms a square like a frame to support the bottom or top of the cabinet/enclosure, thus eliminating the use of complements to fix and support such parts of the cabinet/enclosure, whereas when this is necessary, said rim would also provide conditions for the configuration of a complementary compartment at the bottom or top of the cabinet/enclosure.

Third Preferred Embodiment

Figure 16C:
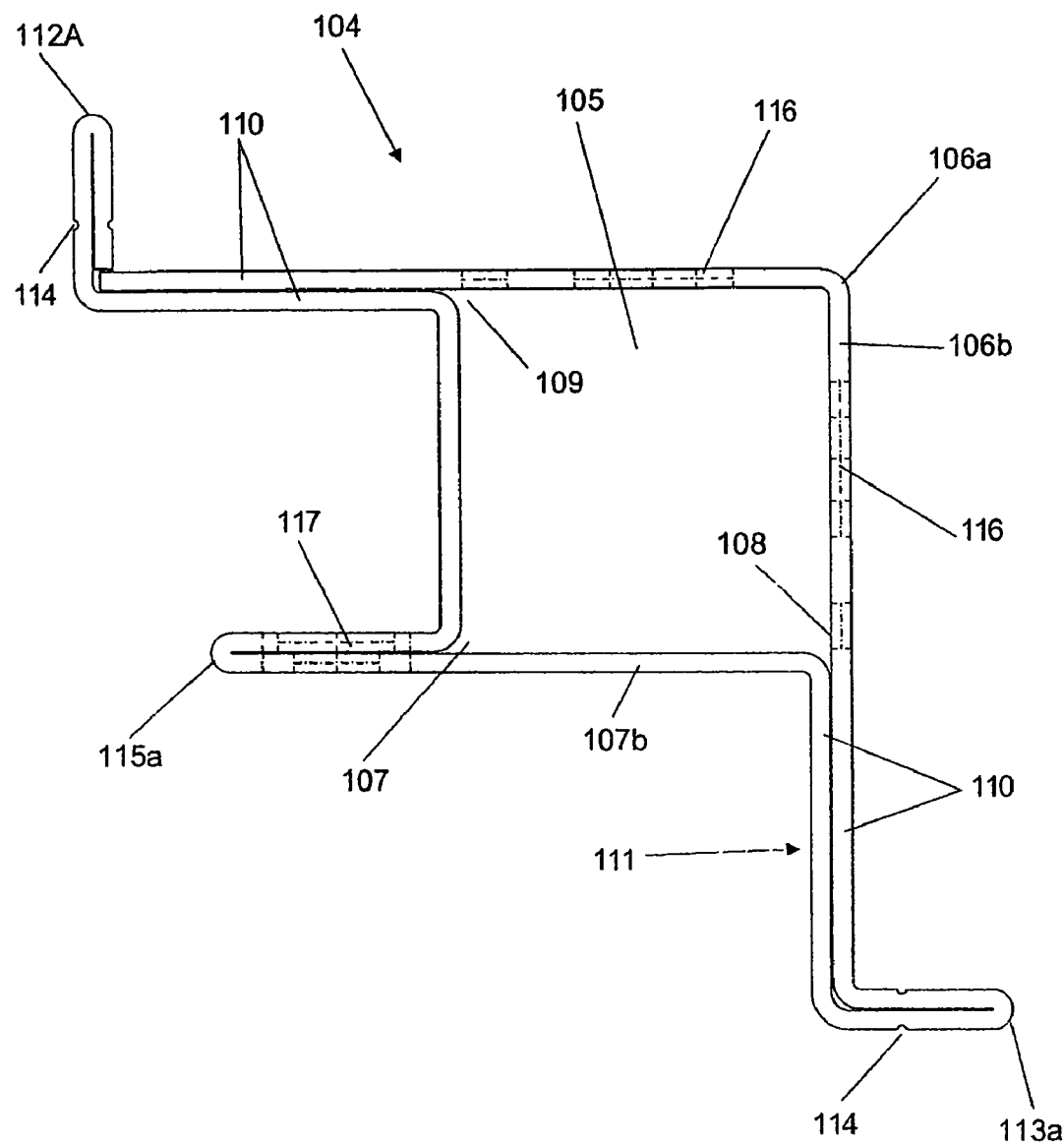

FIG. 16C exhibits the third preferred embodiment for the profile in question, maintaining practically the same transversal geometry illustrated in FIG. 16B, although in this case it is characterized by the fact that its end (112a) is perpendicularly folded outwards like the end (113a), so that this end (112a) can cater to other assembly situations of some sealing components and others located outside the cabinet/enclosure.

Fourth Preferred Embodiment

Figure 16D:
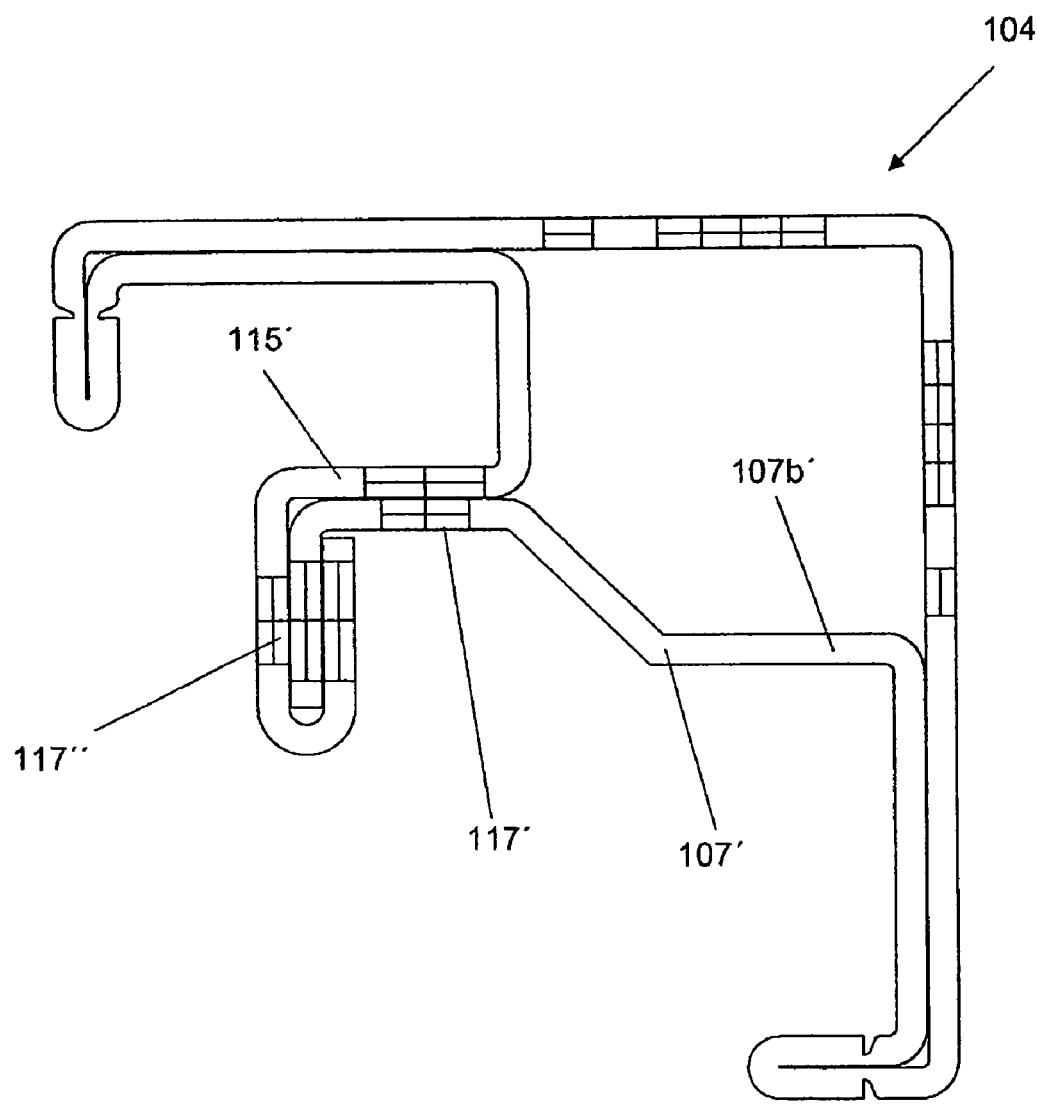

FIG. 16D illustrates the fourth preferred embodiment for the profile in question, maintaining practically the same transversal geometry illustrated in FIG. 4, although in this case it is characterized by the fact that its wall (107b') presents its vertex (107') with an internal angle substantially larger than 90 degrees, and its intermediary rim (115') has a second perpendicular fold, which also distributes sundry holes and openings (117') and (117"), so that this rim (115') has two fixing rows in a straight angle, which expands the fixing points for external components, especially with respect to the closings, doors and mechanic interconnection between one structure and another.

Fifth Preferred Embodiment

Figure 17A:
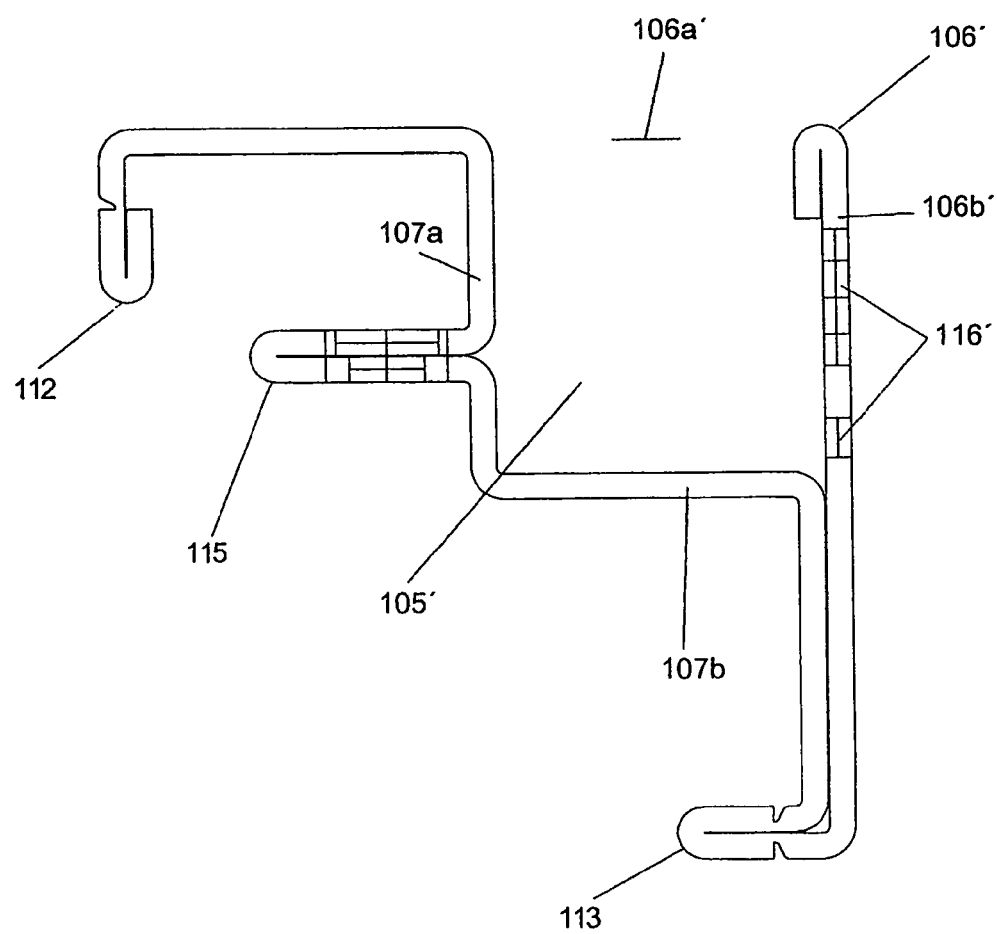

FIG. 17A exhibits another preferred embodiment of the profile in question, which is characterized by the fact that the tubular core (105) includes only one wall (106b') adjacent to the vertex (106') which, in this case, presents a double wall, so that only one side (106a') is completely open in the form of access to both sides of the openings (116'). Obviously this profile presents the same advantages in comparison to the one from FIG. 4, i.e., the natural sealing promoted by the transversal geometry of the profile is maintained, since its walls (107a) and (107b) are blind, and all the sealing and fixing points (112), (115) and 113) are on the outside, thus guaranteeing the desired sealing effect. In this preferred embodiment the additional advantage is promoted by the open side (106a') and, in this condition, the assembly of different components is facilitated on both sides of the openings (116').

Sixth Preferred Embodiment

Figure 17B:
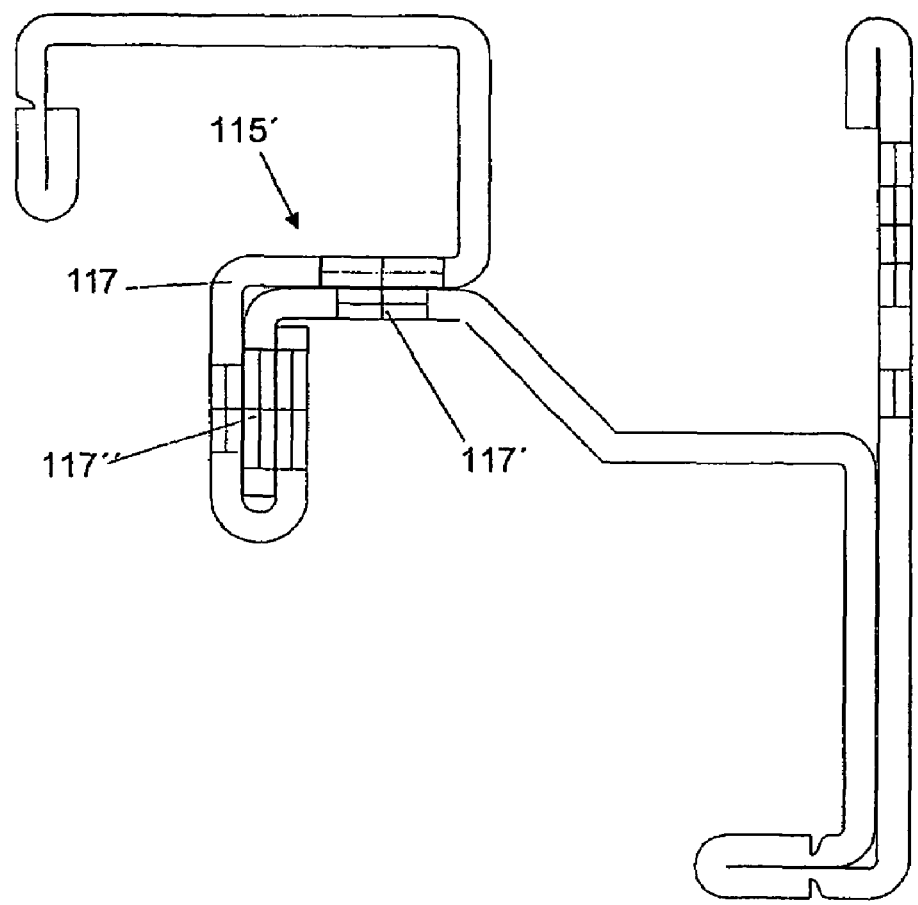

FIG. 17B exhibits the same open profile of the previous figure, although highlighting the fact that it can also include the fold (117) so that the rim (115') can include two groups of openings (117'-117") that are positioned perpendicularly in relation to each other, promoting the same advantages as the profile from FIGS. 16D and 17A.

Seventh Preferred Embodiment

Figure 18A:
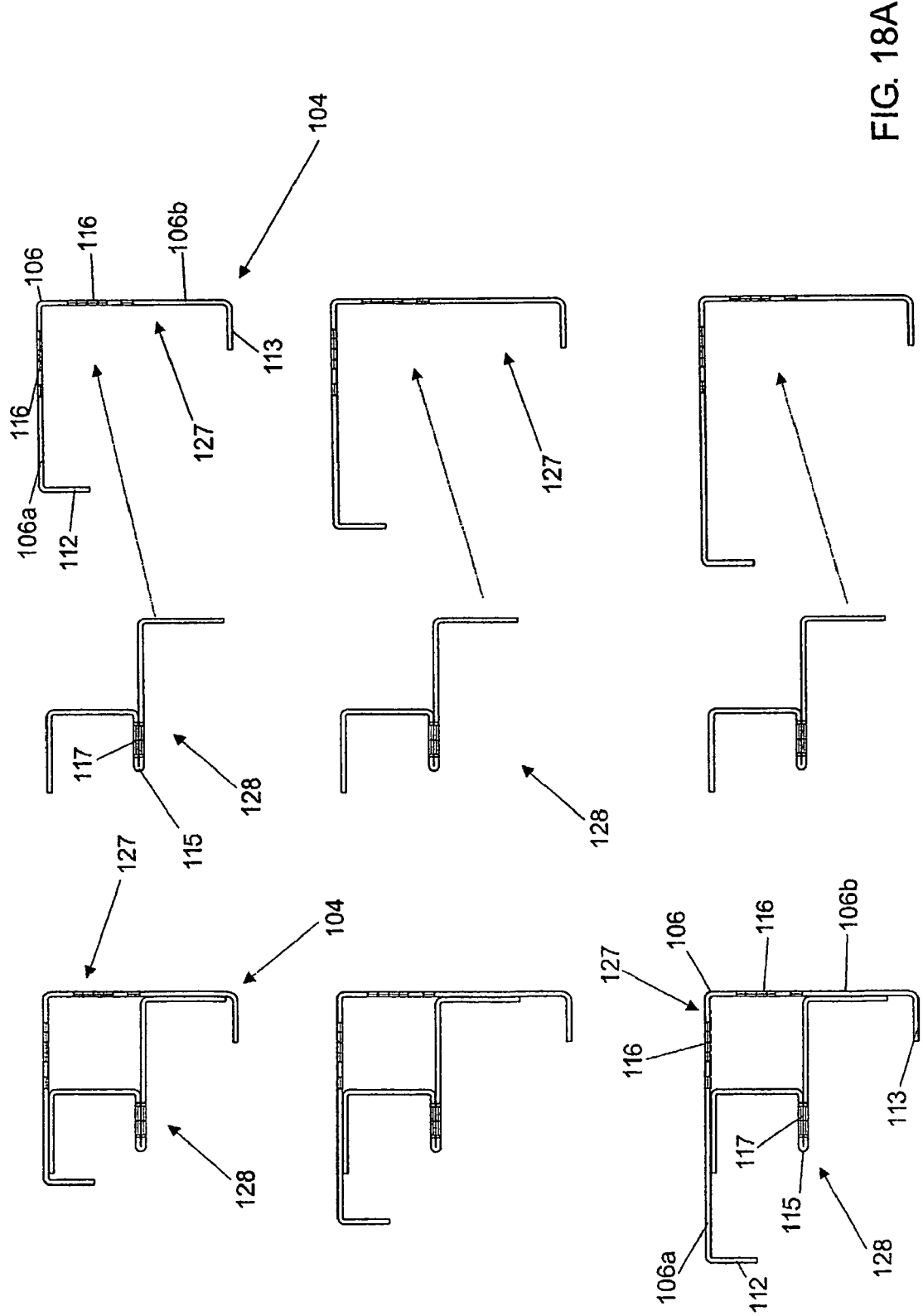
Figure 18B:
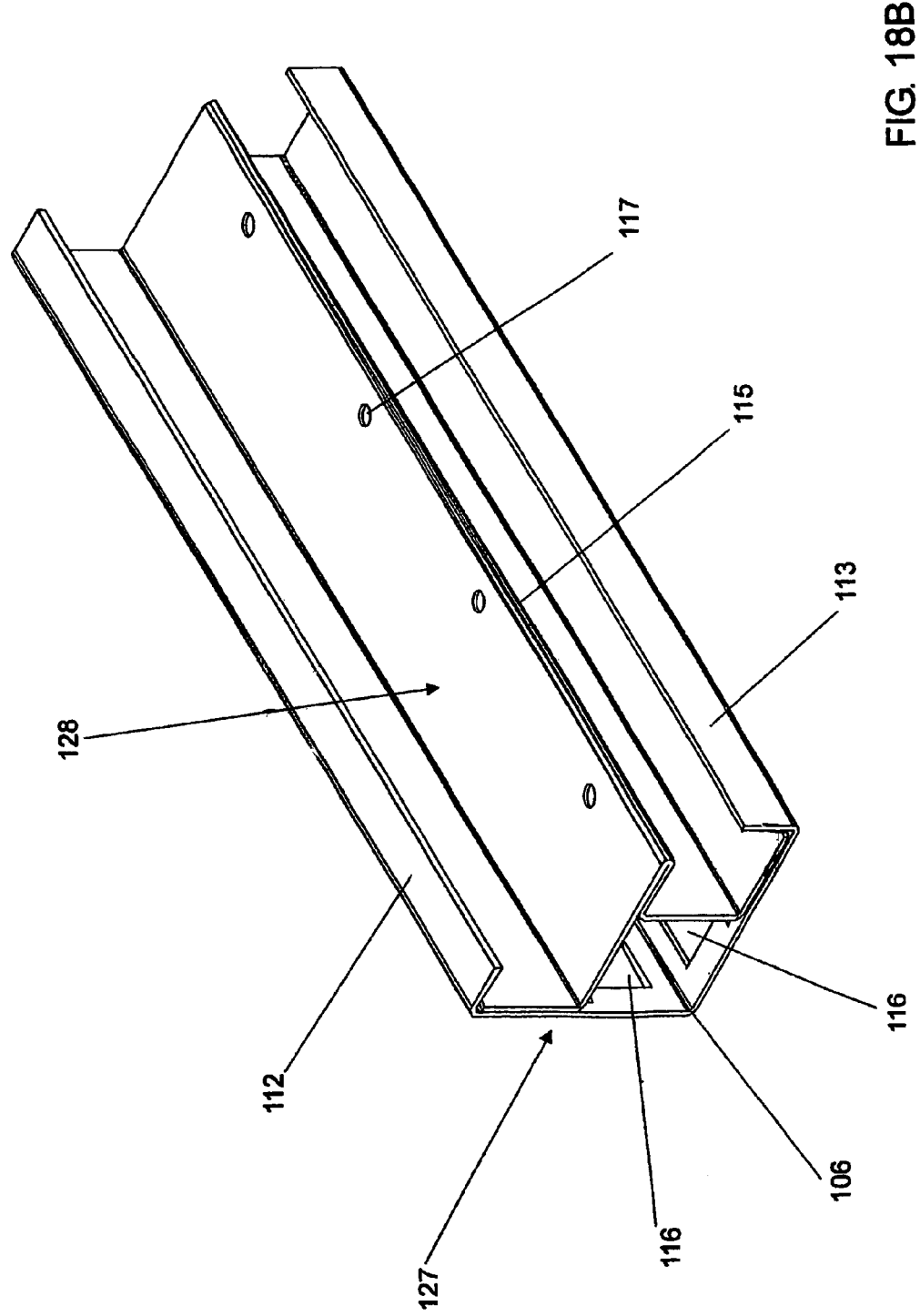
Figure 19:
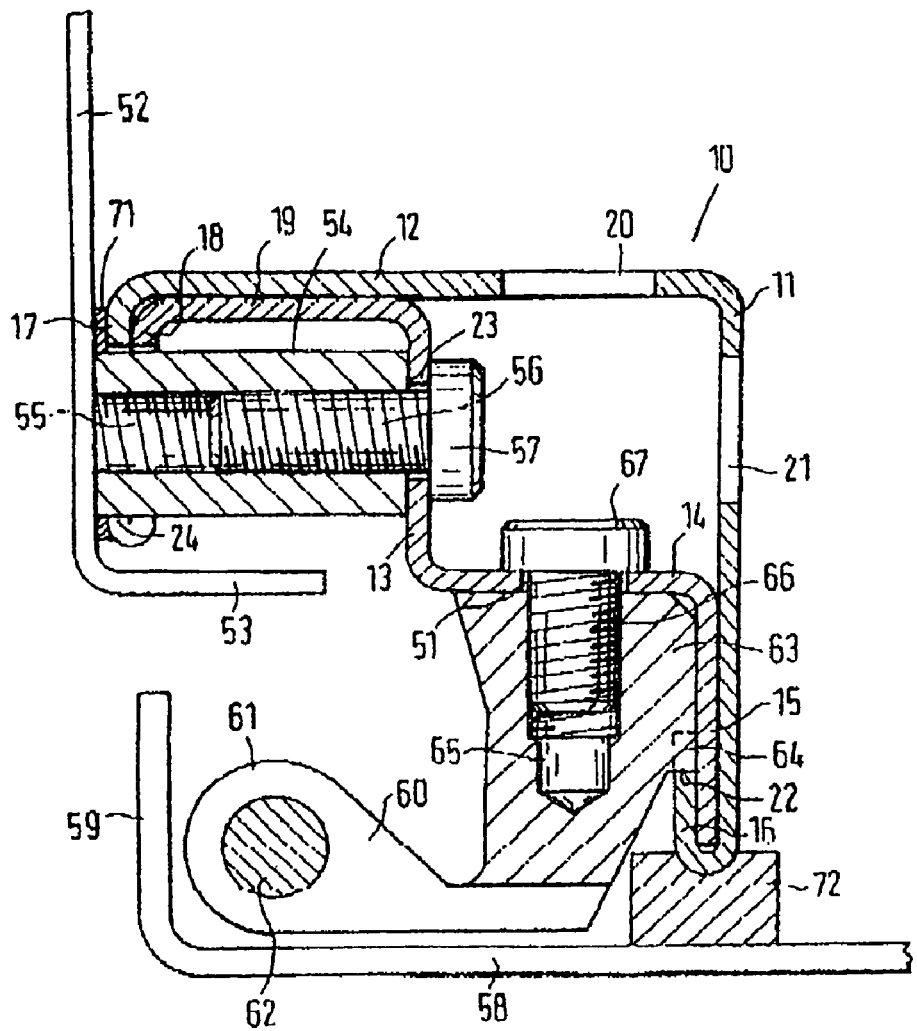
FIG. 19 is a drawing of a profile described in document PI 8.406.283.

As seen above, the profiles in question described in the foregoing figures are all obtained by profiling, i.e., a single sheet is profiled until it attains the shape of the cross section of the profile. FIGS. 18A and 18B exhibit the seventh preferred embodiment, highlighting the fact that the profile in question is also characterized by the fact that its transversal geometry is defined by two independent folded profiles of sheets welded on each other, one (127) inside the cabinet/enclosure and the other (128) outside the cabinet/enclosure, the first incorporating the vertex (106) and respective adjacent walls (106a) and (106b) with the openings (116), while the other includes the rim (115) with the openings (117) whereas this profile includes the ends or rims (112) and (113) perpendicularly folded inwards or outwards. In addition, its walls (106a) and (106b) can be of equal or different lengths, which permits the increase of the profile according to the needs of each case.

Obviously the profile obtained with two folded and welded sheets, can absorb the geometric forms of the other preferred embodiments, so the profile can vary in accordance with the applications of each project.

In accordance with what has been exposed and illustrated here, it can be noted that the profile in question and its accessories, as well as its preferred embodiments, permits its use for the manufacturing of internal structures of cabinets in general, notably cabinets of the indoor or outdoor type. However, nothing prevents its use in other similar applications, since, as mentioned above, with the profile in question it is possible to form a structure that, at the end, consists of struts and crosses, where those openings (116) constitute fixing points for components, boards, devices, apparatus and/or others. In this condition, the same profile can be used for other different cabinet/enclosure applications, without implying alterations in its construction and in its preferred embodiments.

On the other hand, with the profile in question all those advantages mentioned above are attained easily, not only on account of the new transversal geometry adopted for the profile, but also because this geometry was developed for perfect equilibrium to occur at the end for the assembly of the different external components, such as closings and doors, whose fixing points are positioned outside the profile, while openings are provided on the inside for the assembly of equipment inside the cabinet/enclosure or box; hence the natural sealing of the profile is maintained intact.

The invention claimed is:

1. An improved metallic profile used in the assembly of cabinets, enclosures, boxes or panel boards (100), of an indoor or outdoor type, said cabinets being in the form of a metallic box having side closures (101), including one or more tilting doors (102), such closures, including the doors, being made of substantially thin metallic sheets, an assembly of the metallic profiles (104) forming a structure (103) which, on an outside, support the closures and accessories, while on an inside, has struts for the assembly of electric and electronic components and devices, the metallic profile (104) comprising a cross section formed from a folded metallic sheet with a geometry defined by a central core in a tubular shape with a quadrangular section (105), a first vertex (106) oriented to the inside of the cabinet (100), an opposite first vertex (107) oriented to the outside of the cabinet (100), the two first vertexes formed by single walls, two second vertexes (108, 109) being formed at joints where the sheet is folded to form the two first vertexes (106, 107), from this point on, double walls (110) extend in a coplanar position in relation to walls (106a, 106b) adjacent to the first vertex (106), forming opposite rims (111a, 111b), whose ends are perpendicularly folded for forming short ends (112, 113) that are grooved (114) and parallel to but distanced away from walls (107a, 107b) adjacent to the opposite first vertex (107), one wall (107a) of the walls adjacent to the opposite first vertex (107) includes a projection perpendicularly oriented to the outside for forming a perpendicular rim (115), the projection formed by a first end of the metallic sheet extended along the perpendicular orientation of the projection, the first end received within a U-shaped bend in a second end of the metallic sheet, the jointed ends forming the perpendicular rim (115), the perpendicular rim having openings (117) for fixing components thereto.

2. The improved metallic profile of claim 1 wherein the walls adjacent to the opposite first vertex (107) are located outside the cabinet (100), and are completely blind.

3. The improved metallic profile of claim 1 wherein the walls adjacent to the first vertex (106) are located inside the cabinet (100), and distribute rows of openings and holes of variable shapes and sizes (116).

4. The improved metallic profile of claim 1 wherein the structure (103), the union of profiles (104), and the rims (111a, 111b, 115) face the outside and are combined such that all sides of the structure (103) are symmetrically equal, including a top and a bottom side thereof.

5. The improved metallic profile of claim 1 wherein one of the short ends (113) form a fitting rail for an "a" type gasket (118).

6. The improved metallic profile of claim 1 wherein the openings (117) in the rim (115) provides fixing points for screws (122) for fixing the closures (101), sealed using a profile or "a" type gasket applied to one of the short ends (113).

7. The improved metallic profile of claim 1 wherein one of the short ends (112) configure flat props for receiving a sealing cord (123), fixed to an inside of the closure (101) or on a front of one of the short ends (112).

8. The improved metallic profile of claim 1 wherein two structures are joined side by side such that the profile (104) has its ends folded in a straight angle (113) adjusted in an opposed manner or side by side, a seal (123) located therebetween, the seal maintained with a pressure provided by an accessory or flat bar bracket folded in a "U" shape (124) mounted with screws (125), to establish an interconnection between two tubular cores (105), the interconnection additionally having a rod (126) for interconnecting at least two rims (115), the rod fixed with other screws (125).

9. The improved metallic profile of claim 1 wherein the profile (104) and the rim (115a) are formed at exactly a point defined by the opposite first vertex (107), in a coplanar position in relation to the adjacent wall (107b) and perpendicular to the other adjacent wall (107a).

10. The improved metallic profile of claim 9 wherein the profile (104) forms a top or a bottom of a cabinet (100), the rims folded outwards (113a) defining an assembly support board for the bottom and top of the cabinet (100).

11. The improved metallic profile of claim 1 wherein the profile (104) presents the rim (111) perpendicularly folded outwards.

12. The improved metallic profile of claim 1 wherein the profile (104) has its end (112a) perpendicularly folded outwards.

13. The improved metallic profile of claim 1 wherein the profile (104) and its wall (107b') presents a vertex (107') with an internal angle substantially larger than 90 degrees, and an intermediary rim (115') has a second perpendicular fold having holes and openings (117', 117"), such that the intermediary rim (115') provides two fixing rows in a straight angle.

* * * * *